United States Patent
Motosugi et al.

(10) Patent No.: US 10,982,764 B2
(45) Date of Patent: Apr. 20, 2021

(54) CONTROL METHOD AND CONTROL DEVICE FOR CONTINUOUSLY VARIABLE TRANSMISSION

(71) Applicant: NISSAN MOTOR CO., LTD., Yokohama (JP)

(72) Inventors: Jun Motosugi, Kanagawa (JP); Toshiji Fujimoto, Kanagawa (JP); Kouji Okajima, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 16/633,255

(22) PCT Filed: Aug. 23, 2017

(86) PCT No.: PCT/JP2017/030104
§ 371 (c)(1),
(2) Date: Jan. 23, 2020

(87) PCT Pub. No.: WO2019/038852
PCT Pub. Date: Feb. 28, 2019

(65) Prior Publication Data
US 2020/0173552 A1   Jun. 4, 2020

(51) Int. Cl.
*F16H 61/662*   (2006.01)
*F16H 9/16*   (2006.01)
*F16H 61/30*   (2006.01)

(52) U.S. Cl.
CPC .............. *F16H 61/662* (2013.01); *F16H 9/16* (2013.01); *F16H 61/30* (2013.01)

(58) Field of Classification Search
CPC ......... F16H 61/66272; F16H 61/66259; F16H 61/66254; F16H 2061/66286; Y10T 477/624
USPC .......................................................... 474/28
See application file for complete search history.

(56) References Cited

U.S. PATENT DOCUMENTS

| | | | | | |
|---|---|---|---|---|---|
| 4,702,128 | A | * | 10/1987 | Oshiage | B60W 30/18 474/28 |
| 4,772,249 | A | * | 9/1988 | Kouno | B60W 30/18 474/28 |
| 5,993,338 | A | * | 11/1999 | Kato | F16H 61/66254 318/568.18 |

(Continued)

FOREIGN PATENT DOCUMENTS

| | | |
|---|---|---|
| JP | 2000-193075 A | 7/2000 |
| JP | 2008-291933 A | 12/2008 |
| JP | 4248147 B2 | 4/2009 |

*Primary Examiner* — Henry Y Liu
(74) *Attorney, Agent, or Firm* — Faegre Drinker Biddle & Reath LLP

(57) ABSTRACT

A method controls a continuously variable transmission including: an oil pump disposed in an oil passage between a primary oil chamber and a secondary oil chamber to control a flow of oil from the secondary oil chamber to the primary oil chamber; and an oil supply source to supply oil to the secondary oil chamber, and the method includes: calculating a secondary hydraulic-pressure command value based on a required primary hydraulic pressure that is a pressure in the primary oil chamber required to transmit an input torque to an output side; and controlling the oil supply source in accordance with the secondary hydraulic-pressure command value.

8 Claims, 17 Drawing Sheets

(56) References Cited

U.S. PATENT DOCUMENTS

| | | | | |
|---|---|---|---|---|
| 6,219,608 B1* | 4/2001 | Abo | F16H 61/66259 | 474/28 |
| 6,243,638 B1* | 6/2001 | Abo | F16H 61/66254 | 474/18 |
| 6,485,392 B2* | 11/2002 | Miyazaki | F16H 61/66272 | 474/11 |
| 6,733,417 B2* | 5/2004 | Ajimoto | F16H 61/0021 | 474/11 |
| 6,739,994 B1* | 5/2004 | Van Rooij | F16H 61/0031 | 474/18 |
| 6,813,551 B2* | 11/2004 | Taniguchi | F16H 61/66259 | 701/59 |
| 7,029,410 B2* | 4/2006 | Sawada | B60W 10/06 | 474/18 |
| 7,192,372 B2* | 3/2007 | Sawada | F16H 61/66272 | 474/28 |
| 7,387,589 B2* | 6/2008 | Suzuki | F16H 61/66254 | 474/12 |
| 7,546,196 B2* | 6/2009 | Izumi | F16H 61/66254 | 474/18 |
| 7,670,239 B2* | 3/2010 | Suzuki | F16H 61/66259 | 474/8 |
| 7,677,997 B2* | 3/2010 | Hiramatsu | F16H 55/56 | 474/28 |
| 7,931,551 B2* | 4/2011 | Katou | F16H 61/66272 | 474/28 |
| 8,133,140 B2* | 3/2012 | Yamaguchi | F16H 61/66272 | 474/28 |
| 8,412,636 B2* | 4/2013 | Katou | F16H 61/66272 | 705/51 |
| 8,798,877 B2* | 8/2014 | Ayabe | F16H 61/66259 | 701/51 |
| 8,812,206 B2* | 8/2014 | Totsuka | F16H 61/662 | 701/58 |
| 2008/0300075 A1* | 12/2008 | Yoshinami | F16H 61/0025 | 474/28 |
| 2010/0248874 A1* | 9/2010 | Katou | F16H 61/66272 | 474/28 |

* cited by examiner

CONTROL METHOD AND CONTROL DEVICE FOR CONTINUOUSLY VARIABLE TRANSMISSION

TECHNICAL FIELD

The present invention relates to the control of a continuously variable transmission including an oil pump disposed in an oil passage between a primary oil chamber and a secondary oil chamber to control the flow of oil from the secondary oil chamber to the primary oil chamber, and an oil supply source to supply oil to the secondary oil chamber.

BACKGROUND ART

JP 4248147 discloses a control method of a continuously variable transmission having such a configuration. The method controls the pressure of the secondary oil chamber to adjust the clamping force to clamp the belt and accordingly controls the amount of oil supplied to and discharged from the primary oil chamber, and control the speed ratio. That is, this control method controls the speed ratio based on the piston position of the primary pulley that is determined based on the known volume of the primary oil chamber and the amount of oil supplied to and discharged from the primary oil chamber.

SUMMARY OF INVENTION

Widely available continuously variable transmissions typically control the shift while controlling the hydraulic pressure to be supplied to each of the primary oil chamber and the secondary oil chamber with a hydraulic control valve. Such a configuration and control requires continuously applying the hydraulic pressure to the primary oil chamber and the secondary oil chamber, and requires discharging of unnecessary oil from the hydraulic passage every time it changes the speed ratio. Compared with this configuration, the configuration and control in the above document are advantageous because this configuration requires less amount of oil to be discharged from the hydraulic passage because it changes the speed ratio by adjusting the exchange of oil between the secondary oil chamber and the primary oil chamber. Such a configuration has another advantageous effect of keeping the speed ratio constant even in the case of a slight change of the hydraulic pressure due to disturbance, because it controls the speed ratio based on the piston position of the primary pulley.

The control in the above document, however, controls the speed ratio based on the piston position of the primary pulley and does not directly control the pressure in the primary oil chamber. When an input torque increases during travelling, for example, such control may cause belt slip resulting from the shortage of the hydraulic pressure in the primary oil chamber. If the hydraulic pressure in the primary oil chamber increases more than necessary due to disturbance, the control may fail to detect this and so cause deterioration in fuel efficiency.

The present invention aims to control the configuration in the above document so as not to cause any problems resulting from excess or deficiency of the hydraulic pressure in the primary oil chamber.

According to one embodiment of this invention, a method for controlling a continuously variable transmission including: an oil pump disposed in an oil passage between a primary oil chamber and a secondary oil chamber to control a flow of oil from the secondary oil chamber to the primary oil chamber; and an oil supply source configured to supply oil to the secondary oil chamber is provided. The method comprising: calculating a secondary hydraulic-pressure command value based on a required primary hydraulic pressure that is a pressure in the primary oil chamber required to transmit an input torque to an output side; and controlling the oil supply source in accordance with the secondary hydraulic-pressure command value.

DESCRIPTION OF EMBODIMENTS

The following describes embodiments of the present invention, with reference to the attached drawings.

First Embodiment

Figure 1:
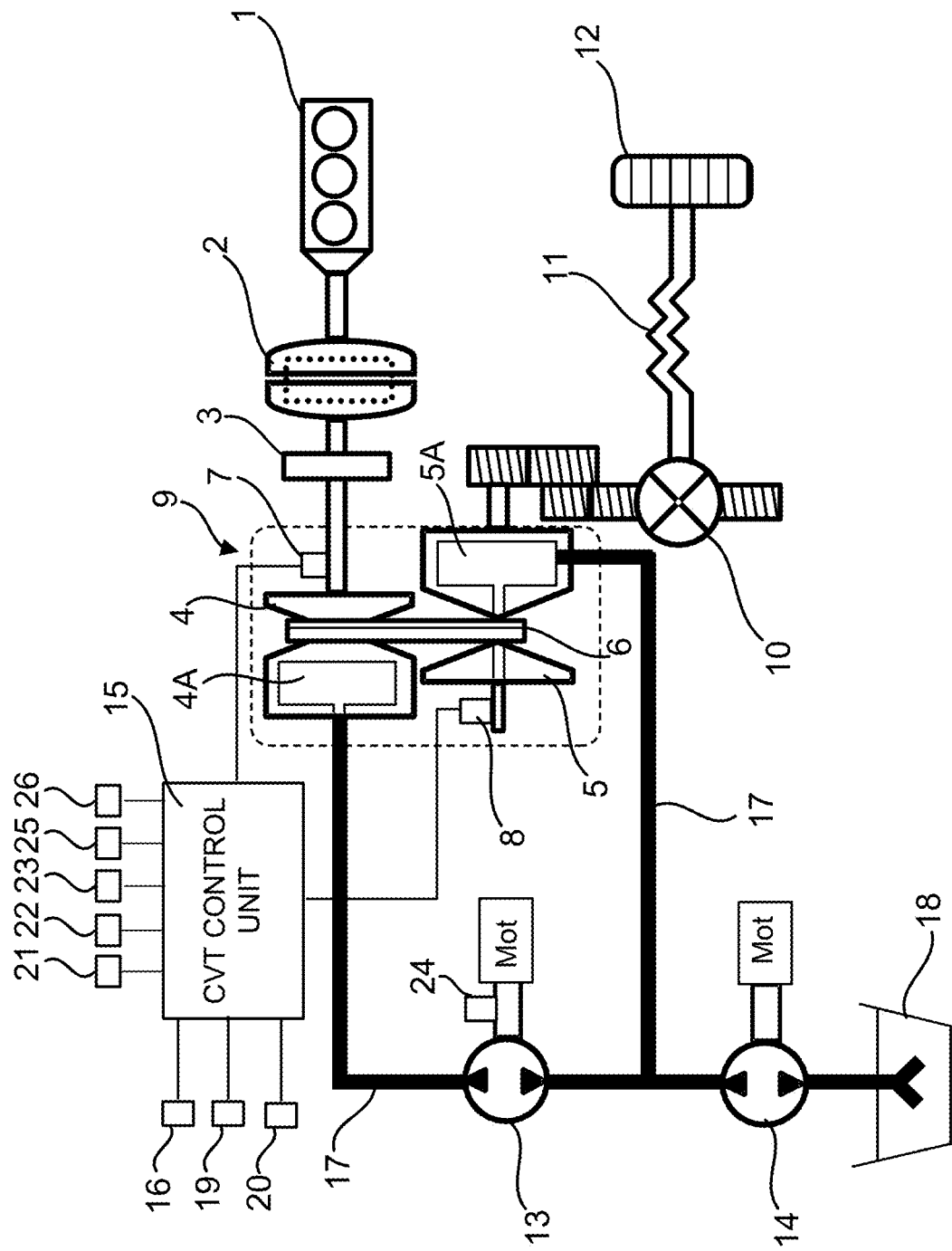
FIG. 1 schematically shows the configuration of a vehicle system.

FIG. 1 schematically shows the configuration of a vehicle system including a continuously variable transmission 9 according to the present embodiment.

This vehicle system includes: an engine 1; a torque converter 2; a forward/reverse switching mechanism 3; a continuously variable transmission 9; a final gear 10; a drive shaft 11; a driving wheel 12; and a CVT control unit 15. The vehicle system also includes detection devices that are a rotation speed sensor 7 to detect the rotation speed of a primary pulley 4, a rotation speed sensor 8 to detect the rotation speed of a secondary pulley 5, and an accelerator pedal opening sensor 16. The CVT control unit 15 receives detection signals from these sensors 7, 8, and 16, and other information, such as torque information, output from an engine control unit not illustrated. The CVT control unit 15 also receives detection signals from current sensors 19, 20 to detect current values of electric pumps 13, 14, a hydraulic-pressure sensor 21 to detect the hydraulic pressure (hereinafter this may be called a primary hydraulic pressure) in the primary oil chamber 4A, and a hydraulic-pressure sensor 22 to detect the hydraulic pressure (hereinafter this may be called a secondary hydraulic pressure) in the secondary oil chamber 5A. The CVT control unit 15 also receives detection signals from a voltage sensor 23 to detect current driving voltage, a rotation speed sensor 24 of the electric pump 13, an engine rotation speed sensor 28, and a vehicle speed sensor 26.

The engine 1 makes up a driving source of a vehicle. The output from the engine 1 is transmitted to the driving wheel 12 via the torque converter 2, the forward/reverse switching mechanism 3, the continuously variable transmission 9, the final gear 10, and the drive shaft 11.

The torque converter 2 is disposed between the engine 1 and the forward/reverse switching mechanism 3, and receives the torque and rotation generated at the engine 1 and transmits them to the forward/reverse switching mechanism 3. The torque converter 2 includes a lock-up clutch (not illustrated) enabling the transmission of torque and rotation of the engine 1 without fluid.

The forward/reverse switching mechanism 3 is disposed between the torque converter 2 and the continuously variable transmission 9, and changes the rotating direction of the input rotation between the normal-rotation direction corresponding to the forward travelling and the reverse-rotation direction corresponding to the backward travelling. The forward/reverse switching mechanism 3 includes a planetary gear, a forward clutch, and a backward brake. The forward clutch engages for the normal rotating direction. The backward brake engages for the reverse rotating direction. One of the forward clutch and the backward brake may be configured as a clutch to interrupt the rotation between the engine 1 and the continuously variable transmission 9.

The continuously variable transmission 9 includes: the primary pulley 4; the secondary pulley 5; a V belt 6; the electric pump 13 as an oil pump to control the flow rate; and the electric pump 14 as an oil supply source to control the pressure. The electric pump 13 is disposed in an oil passage 17 connecting the primary oil chamber 4A for the primary pulley 4 and the secondary oil chamber 5A for the secondary pulley 5. The electric pump 14 is disposed between an oil pan 18 and the oil passage 17.

As the electric pump 13 adjusts the amount of oil supplied to and discharged from the primary oil chamber 4A, the contact radius (hereinafter this may be called a belt-winding radius) of the V belt 6 with the primary pulley 4 and the secondary pulley 5 accordingly changes. Based on this scheme, the continuously variable transmission 9 continuously and steplessly changes the speed ratio.

The electric pump 14 adjusts the amount of oil supplied to and discharged from the secondary oil chamber 5A, and so changes the secondary hydraulic pressure to keep a clamping force required for torque transmission. In the present embodiment, the electric pump 14 operates as the oil supply source, and controls the secondary hydraulic pressure. In another embodiment, the oil supply source may include the electric pump 14 and a hydraulic control valve, and this hydraulic control value may control the hydraulic pressure, for example.

The V belt 6 passes over the primary pulley 4 and the secondary pulley 5 to transmit the torque and rotation input to the primary pulley 4 to the secondary pulley 5. The torque and rotation transmitted to the secondary pulley 5 is decelerated at the final gear 10, and then is transmitted to the driving wheel 12 via the drive shaft 11.

Based on the detection signals of the sensors 7, 8, and 16 as stated above and the torque information from the engine control unit, the CVT control unit 15 controls the rotation speed of the electric pump 13 to control the amount of oil supplied to and discharged from the primary oil chamber 4A. In this way the CVT control unit 15 controls the speed ratio of the continuously variable transmission 9. That is, the CVT control unit 15 controls the amount of oil supplied to and discharged from the primary oil chamber 4A to control the piston position of the primary pulley 4, and thereby achieves the contact radius of the V belt 6 with the primary pulley 4 and the secondary pulley 5 corresponding to a desired speed ratio.

The CVT control unit 15 also controls the torque of the electric pump 14 so as to control the pressure of the secondary oil chamber 5A to keep a clamping force required for torque transmission.

The CVT control unit 15 includes a microcomputer having a central processing unit (CPU), a read only memory (ROM), a random access memory (RAM), and an input/output interface (I/O interface). The CVT control unit 15 may include a plurality of microcomputers.

Next the following describes major processing in the CVT control unit 15.

Figure 2:
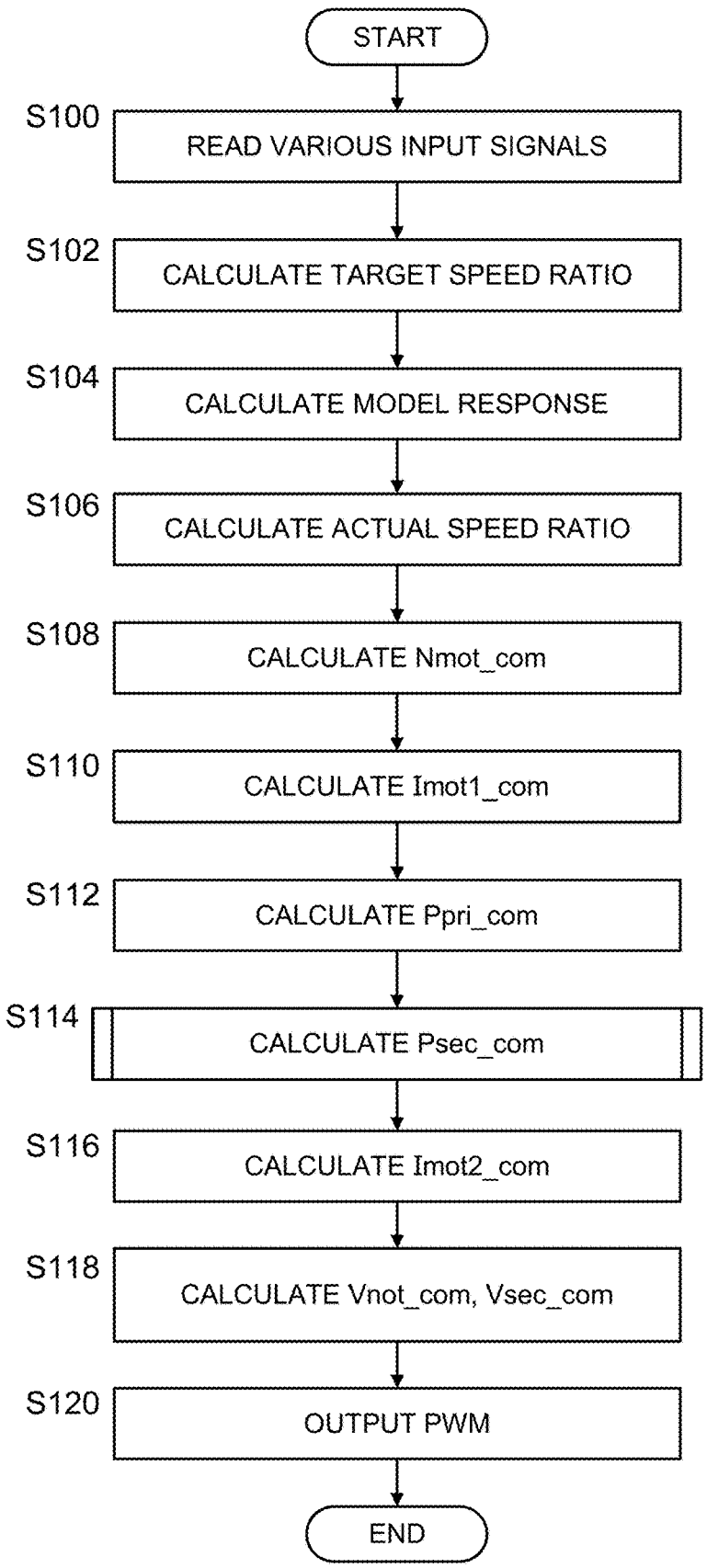
FIG. 2 is a flowchart showing the control routine programmed in a CVT control unit.

FIG. 2 is a flowchart showing the control routine programmed in the CVT control unit 15. This control routine partly includes interrupt processing, and basically runs with a constant sampling period. The following describes the processing step-by-step.

At step S100, the CVT control unit 15 processes input signals, i.e., measures the sensor values at the accelerator pedal opening sensor 16, the current sensors 19 and 20, and the hydraulic pressure sensors 21 and 22 and the current driving voltage Vb as analog signals. The CVT control unit 15 also calculates the rotation speed and the vehicle speed from the period measurements using an input capture function, based on the detection signals from the rotation speed sensor 24 to detect the rotation speed of the electric pump 13, the rotation speed sensors 7, 8, the engine rotation speed sensor 28, and the vehicle speed sensor 26 that are hall sensors, for example.

At step S102, the CVT control unit 15 calculates a speed ratio command value Ratio_com that is a target speed ratio. This speed ratio command value Ratio_com is determined based on the operating state of the vehicle, i.e., the vehicle speed VSP and the accelerator pedal opening APO, and the map of them is created beforehand. This map is similar to a well-known map, and the illustration of this map is omitted.

At step S104, the CVT control unit 15 gives a predetermined response property to the speed ratio command value Ratio_com calculated at step S102 to calculate a speed ratio model response Ratio_ref. Expression (1) represents the desired response property. In Expression (1), s denotes the Laplace operator, and Tref denotes the time constant of the model response.

[Math. 1]

$$\text{Ratio\_ref} = \frac{1}{T_{ref}s + 1} \times \text{Ratio\_com} \qquad (1)$$

At step S106, the CVT control unit 15 calculates an actual speed ratio Ratio from the primary rotation speed Npri and the secondary rotation speed Nsec calculated at step S100. Specifically the CVT control unit 15 calculates this by dividing the primary rotation speed Npri by the secondary rotation speed Nsec.

At step S108, the CVT control unit 15 executes the speed ratio control. Specifically the CVT control unit 15 calculates a rotation speed command value Nmot_com of the electric pump 13 for shift control that is a displacement to bring the speed ratio model response Ratio_ref calculated at step S104 equal to the actual speed ratio Ratio calculated at step S106. In practice the rotation speed command value Nmot_com is the rotation speed command value for a motor to drive the electric pump 13.

In one example, the rotation speed command value Nmot_com may be calculated through PI control shown in Expression 2 of a difference between the speed ratio model response Ratio_ref and the actual speed ratio Ratio.

[Math. 2]

$$\text{Nmot\_com} = \left(K_p + \frac{K_i}{s}\right) \times (\text{Ratio\_ref} - \text{Ratio}) \quad (2)$$

In this expression, Kp and Ki are a proportional gain and an integration gain, respectively, and these values are determined while considering the stability of the feedback loop.

At step S110, the CVT control unit 15 calculates a current command value Imot1_com of the electric pump 13 so as to bring the rotation speed of the electric pump 13 for shift control equal to the rotation speed command value Nmot_com. In one example, the rotation speed control of the electric pump 13 may be conducted through PI control as in the shift control at step S108.

At step S112, the CVT control unit 15 calculates a primary hydraulic-pressure command value Ppri_com to get a required primary hydraulic pressure. The required primary hydraulic pressure means a pressure of the primary oil chamber 4A that is necessary to transmit the torque input to the continuously variable transmission 9, i.e., the engine torque to the output end via the V belt 6. In practice the primary hydraulic-pressure property required to transmit the input torque may be measured beforehand, and this may be stored in the ROM in the form of map data. Then the primary hydraulic-pressure command value may be calculated with the map data based on the input torque. This map data on the primary hydraulic-pressure property is similar to a well-known data, and the illustration of this map data is omitted.

At step S114, the CVT control unit 15 calculates a secondary hydraulic-pressure command value Psec_com based on the primary hydraulic-pressure command value Ppri_com by a subroutine described later.

At step S116, the CVT control unit 15 calculates a torque command value for the electric pump 14 for pressure control to bring the secondary hydraulic pressure Psec equal to the secondary hydraulic-pressure command value Psec_com. Then the CVT control unit 15 converts this torque command value into a current value as a motor current command value Imot2_com. In practice the properties of the motor torque and the motor current may be measured beforehand, and they may be stored in the ROM in the form of map data. Then the motor current command value may be calculated with the map data based on the motor torque command value. In one example, the secondary hydraulic pressure control may be conducted through PI control as in step S110.

At step S118, the CVT control unit 15 calculates voltage command values Vmot_com and Vsec_com to bring the current values detected at step S100 equal to the current command values calculated at step S110 and step S116. The voltage command value Vmot_com is the voltage command value for the electric pump 13, and the voltage command value Vsec_com is the voltage command value for the electric pump 14.

At step S120, the CVT control unit 15 calculates duty command values [%] to implement the voltage command values Vmot_com and Vsec_com calculated at step S118 with PWM control by Expressions (3) and (4), and outputs them with the PWM function of the CPU. Vb in Expressions (3) and (4) is the voltage for current driving obtained at step S100.

[Math. 3]

$$\text{Duty\_mot\_com} = \frac{\text{Vmot\_com}}{V_B} \times 100 \quad (3)$$

[Math. 4]

$$\text{Duty\_sec\_com} = \frac{V\_\text{sec\_com}}{V_B} \times 100 \quad (4)$$

The control routine may another step inserted between step S110 and step S112 to determine whether compensation of primary hydraulic pressure is required or not, and when such a step is required, the control routine may execute the processing at step S112 or later. In one example, such processing is required when the input torque is large enough to cause belt slip.

Next the following describes the processing at step S114.

Figure 3:
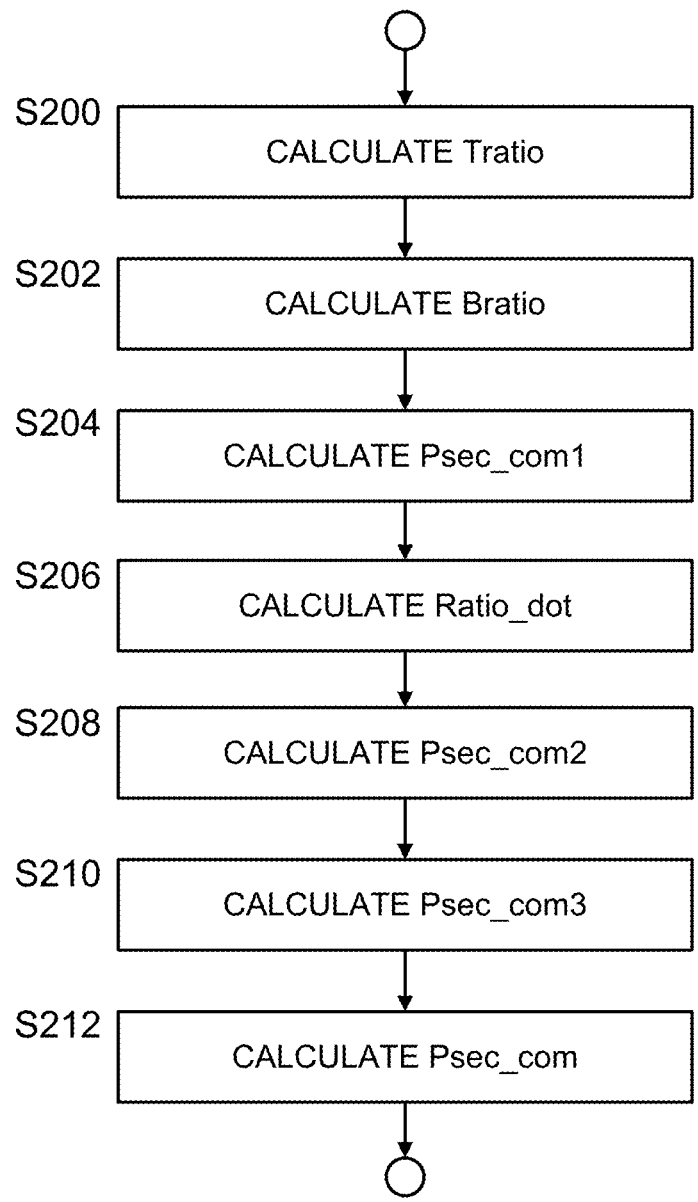
FIG. 3 is a flowchart showing the subroutine executed at step S114 in FIG. 2.

FIG. 3 is a flowchart showing the subroutine executed at step S114.

At step S200, the CVT control unit 15 calculates a torque ratio Tratio. In one example, the torque ratio can be calculated by Expression (5) using the engine torque Te and the secondary hydraulic pressure Psec. Note here that $\mu$ denotes the coefficient of friction, R denotes the belt-winding radius, Asec denotes the cross-sectional area of the secondary hydraulic cylinder, and $\alpha$ denotes the sheave angle.

[Math. 5]

$$T_{ratio} = \frac{Te \cos \alpha}{2\mu R P_{sec} A_{sec}} \quad (5)$$

At step S202, the CVT control unit 15 calculates a balance thrust-force ratio Bratio based on the actual speed ratio Ratio and the torque ratio Tratio. Specifically the primary hydraulic pressure Ppri and the secondary hydraulic pressure Psec of the actual device for the present embodiment may be measured beforehand under various conditions on the actual speed ratio Ratio and the torque ratio Tratio, and the result of measurements may be stored in the ROM in the form of map data. Then the balance thrust-force ratio Bratio can be calculated based on the cross-sectional area APri of the primary hydraulic cylinder and the cross-sectional area Asec of the secondary hydraulic cylinder that are determined beforehand as well as the primary hydraulic pressure Ppri and the secondary hydraulic pressure Psec that are obtained by map calculation and by Expression (6).

[Math. 6]
$$B_{ratio} = \frac{P_{pri}A_{pri}}{P_{sec}A_{sec}} \quad (6)$$

At step S204, the CVT control unit 15 calculates a secondary hydraulic-pressure steady command value Psec_com1 based on the primary hydraulic-pressure command value Ppri_com and the balance thrust-force ratio Bratio by Expression (7). Expression (7) is obtained by substituting the primary hydraulic pressure Ppri and the secondary hydraulic pressure Psec in Expression (6) with the primary hydraulic-pressure command value Ppri_com and the secondary hydraulic-pressure steady command value Psec_com1, respectively.

The CVT control unit 15 calculates the secondary hydraulic-pressure steady command value Psec_com1, which is a command value for the secondary hydraulic pressure, based on the required primary hydraulic pressure. In this way, the CVT control unit 15 adjusts the secondary hydraulic pressure Psec and accordingly controls the primary hydraulic pressure Ppri.

When the speed ratio, the input torque and the secondary hydraulic pressure are constant, the balance thrust-force ratio Bratio is the ratio between the primary thrust force and the secondary thrust force that depend on the mechanical property of the continuously variable transmission 9. This means that the secondary hydraulic-pressure steady command value Psec_com1 calculated at this step may be used as a command value for the secondary hydraulic pressure, and this improves the control accuracy of the primary hydraulic pressure when the speed ratio is constant, i.e., in the steady state.

[Math. 7]
$$P_{sec\_com1} = \frac{P_{pri\_com}A_{pri}}{B_{ratio}A_{sec}} \quad (7)$$

At step S206, the CVT control unit 15 performs differential operation of the actual speed ratio Ratio to calculate a shift speed Ratio_dot. In one example, the shift speed may be calculated by Expression (8). In Expression (8), s denotes the Laplace operator, and Tr denotes the time constant of an approximate differential filter.

[Math. 8]
$$Ratio\_dot = \frac{s}{T_r s + 1} \times Ratio \quad (8)$$

At step S208, the CVT control unit 15 calculates a secondary hydraulic-pressure transient command value Psec_com2 based on the shift speed Ratio_dot. In one example, the secondary hydraulic-pressure transient command value can be calculated by Expression (9). Note here that fitting of the proportional gain Ksft may be conducted beforehand with the actual device for the present embodiment. The secondary hydraulic-pressure transient command value Psec_com2 is a correction term to correct the secondary hydraulic-pressure steady command value Psec_com1 to enhance the control accuracy during the transient period where the speed ratio changes.

[Math. 9]
$$P_{sec\_com2} = K_{sft}Ratio\_dot \quad (9)$$

At step S210, the CVT control unit 15 calculates a secondary hydraulic-pressure FB compensation command value Psec_com3 based on the primary hydraulic-pressure command value Ppri_com and the primary hydraulic pressure Ppri. In one example, the secondary hydraulic-pressure FB compensation command value can be calculated by applying I control shown in Expression (10) to a difference between the primary hydraulic-pressure command value Ppri_com and the primary hydraulic pressure Pri. In Expression (10), Kpri denotes an integration gain, which can be determined while considering the stability of the feedback loop. This secondary hydraulic-pressure FB compensation command value Psec_com3 is a correction term used for feedback control to suppress influences from the variations of manufacturing, aging variations or the like. FB stands for "feedback".

[Math. 10]
$$P_{sec\_com3} = \frac{K_{pri}}{s} \times (P_{pri\_com} - P_{pri}) \quad (10)$$

At step S212, the CVT control unit 15 calculates a secondary hydraulic-pressure command value Psec_com that is a final command value for the secondary hydraulic pressure by Expression (11) based on the command values calculated at steps S206, S208, and S210.

[Math. 11]
$$P_{sec\_com} = P_{sec\_com1} + P_{sec\_com2} + P_{sec\_com3} \quad (11)$$

In this way the control routine corrects the secondary hydraulic-pressure steady command value Psec_com1, which is to keep the required primary hydraulic pressure in the stead state, with the secondary hydraulic-pressure transient command value Psec_com2 and the secondary hydraulic-pressure FB compensation command value Psec_com3, and sets this as the secondary hydraulic-pressure command value Psec_com.

Such a correction with the secondary hydraulic-pressure transient command value Psec_com2 corrects a secondary hydraulic-pressure steady command value Psec_com1 having a speedy downshift to increase the pressure, and corrects the secondary hydraulic-pressure steady command value Psec_com1 having a speedy upshift to decrease the pressure. This improves the transient control accuracy of the primary hydraulic pressure during shifting. The correction with the secondary hydraulic-pressure FB compensation command value Psec_com3 suppresses influences from variations of manufacturing, aging variations or the like.

The above describes the calculation of the secondary hydraulic-pressure transient command value Psec_com2 with the changing rate of the actual speed ratio Ratio. In another embodiment, a changing rate of the target speed ratio may be used for the calculation instead of the changing rate of the actual speed ratio Ratio.

The following describes the advantageous effects from the present embodiment.

Figure 4:
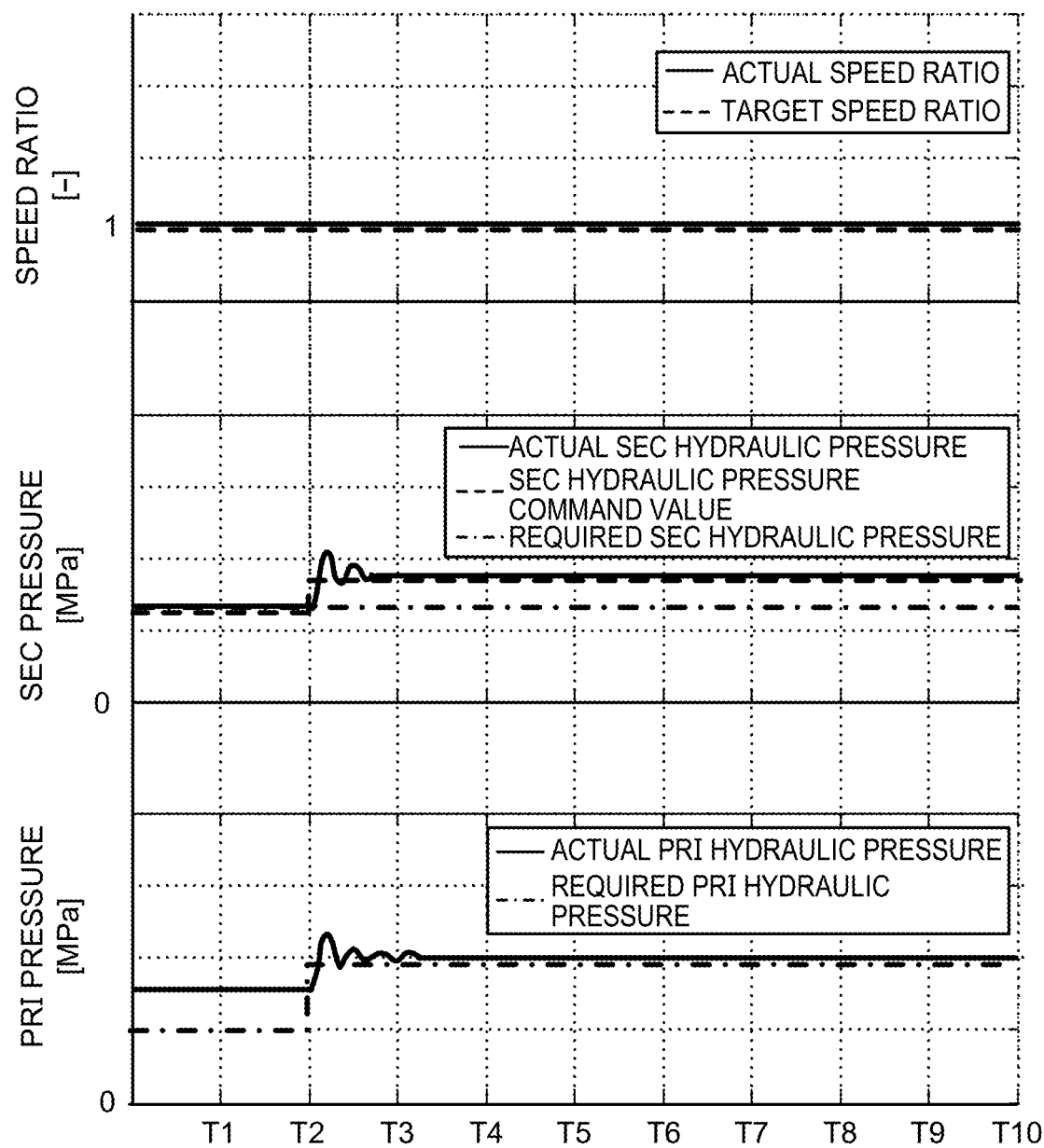
FIG. 4 is a timing chart of the control based on a secondary hydraulic-pressure steady command value.
Figure 5:
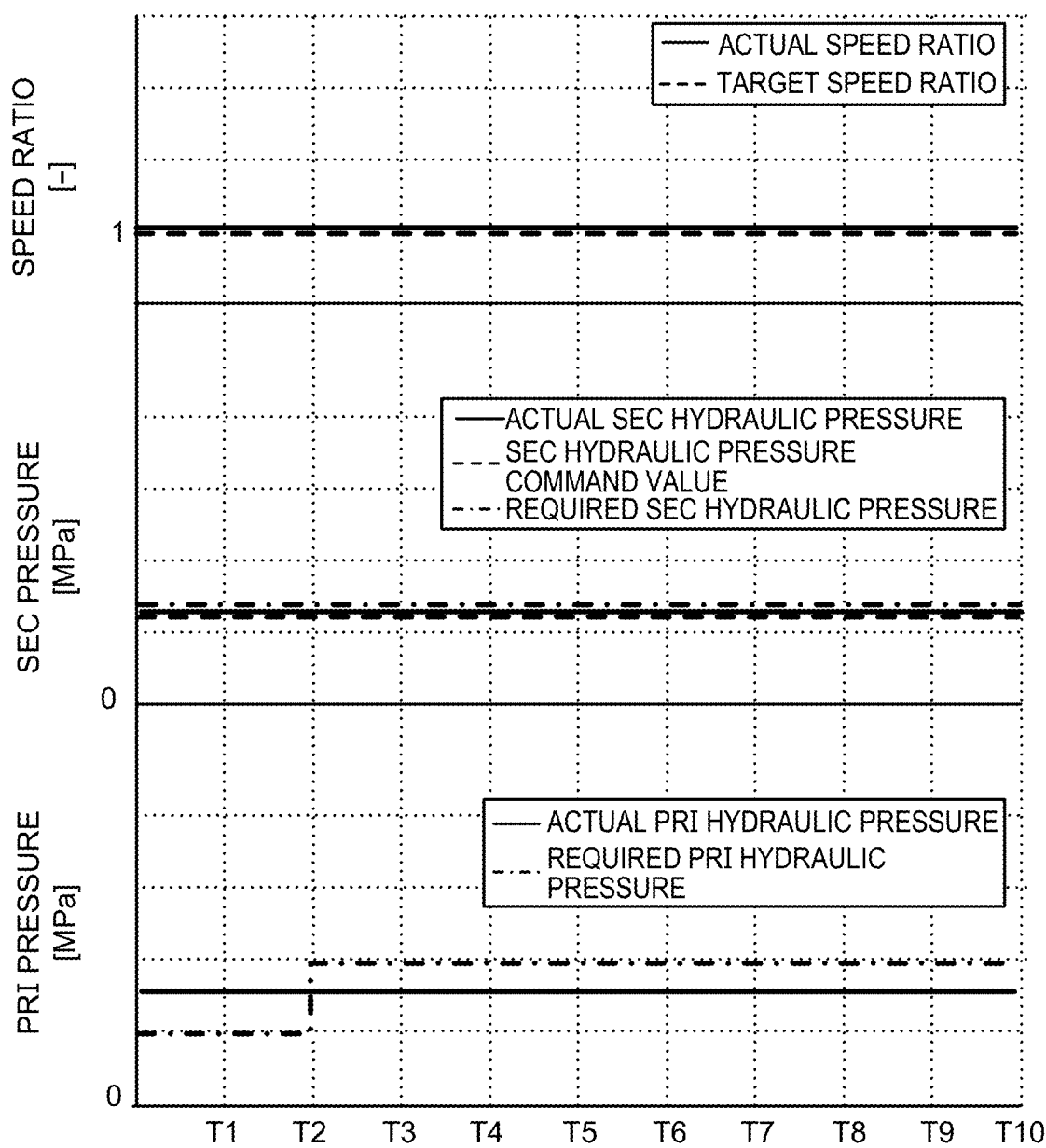
FIG. 5 is a timing chart of a comparative example relative to FIG. 4.

FIG. 4 is a timing chart to describe the advantageous effects from the calculation of the secondary hydraulic-pressure steady command value Psec_com1 based on the required primary hydraulic pressure. FIG. 5 shows a comparative example of the present embodiment, and is a timing chart showing the case of executing well-known control without executing the control routine in FIG. 2 and FIG. 3 in the configuration of FIG. 1. The solid lines in these drawings indicate actual values, and the broken lines indicate command values (or target values). The dashed-dotted lines in these drawings indicate required secondary hydraulic pressure and required primary hydraulic pressure. The required secondary hydraulic pressure is the pressure in the secondary oil chamber 4B that is necessary to transmit the input torque to the output side. In these drawings, "PRI" stands for primary, and "SEC" stands for secondary.

In both of FIG. 4 and FIG. 5, the target speed ratio is constant. In both of FIG. 4 and FIG. 5, the input torque increases at timing T2, and the required primary hydraulic pressure accordingly gets higher than the actual primary hydraulic pressure before timing T2.

In the comparative example in FIG. 5, the primary side is controlled based on the piston position of the primary pulley 4. When the target speed ratio is constant, the piston position of the primary pulley 4 does not need to be changed. In this case the actual primary hydraulic pressure is still kept constant after the increase in input torque at timing T2. This comparative example does not consider the primary hydraulic pressure to calculate the secondary hydraulic-pressure command value. This comparative example therefore keeps the secondary hydraulic-pressure command value constant when the target speed ratio is constant. As a result, the actual primary hydraulic pressure is lower than the required primary hydraulic pressure, and this causes belt slip.

On the contrary, the present embodiment shown in FIG. 4 increases the secondary hydraulic-pressure steady command value Psec_com1 with the required primary hydraulic pressure, and so the secondary hydraulic-pressure command value Psec_com also increases, which is a final command value. This secondary hydraulic-pressure steady command value Psec_com1 is the value to implement the required primary hydraulic pressure. The present embodiment therefore suppresses belt slip, because the actual primary hydraulic pressure increases to the required primary hydraulic pressure in accordance with an increase in the input torque.

Figure 6:
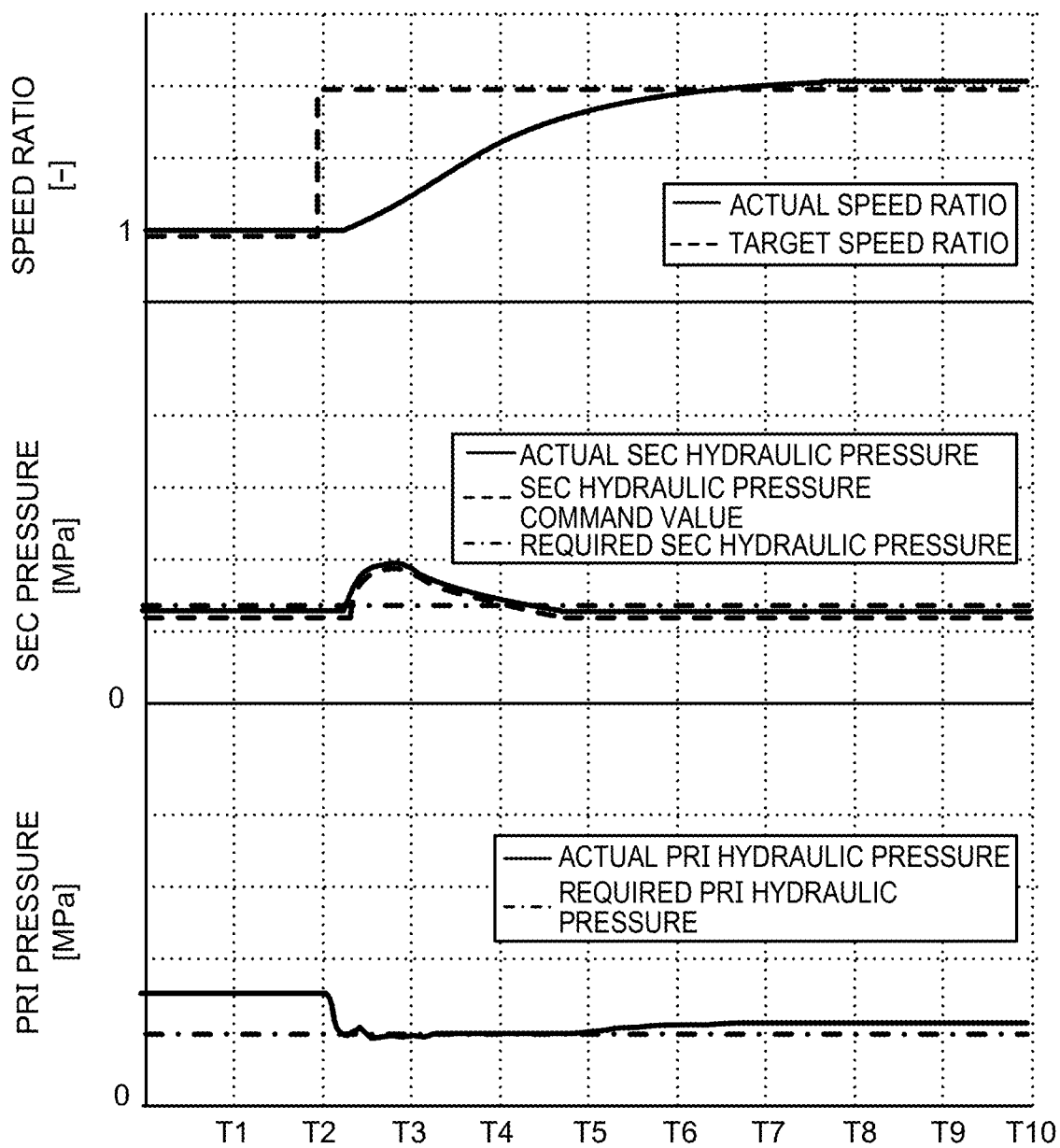
FIG. 6 is a timing chart of control based on a secondary hydraulic-pressure transient command value.
Figure 7:
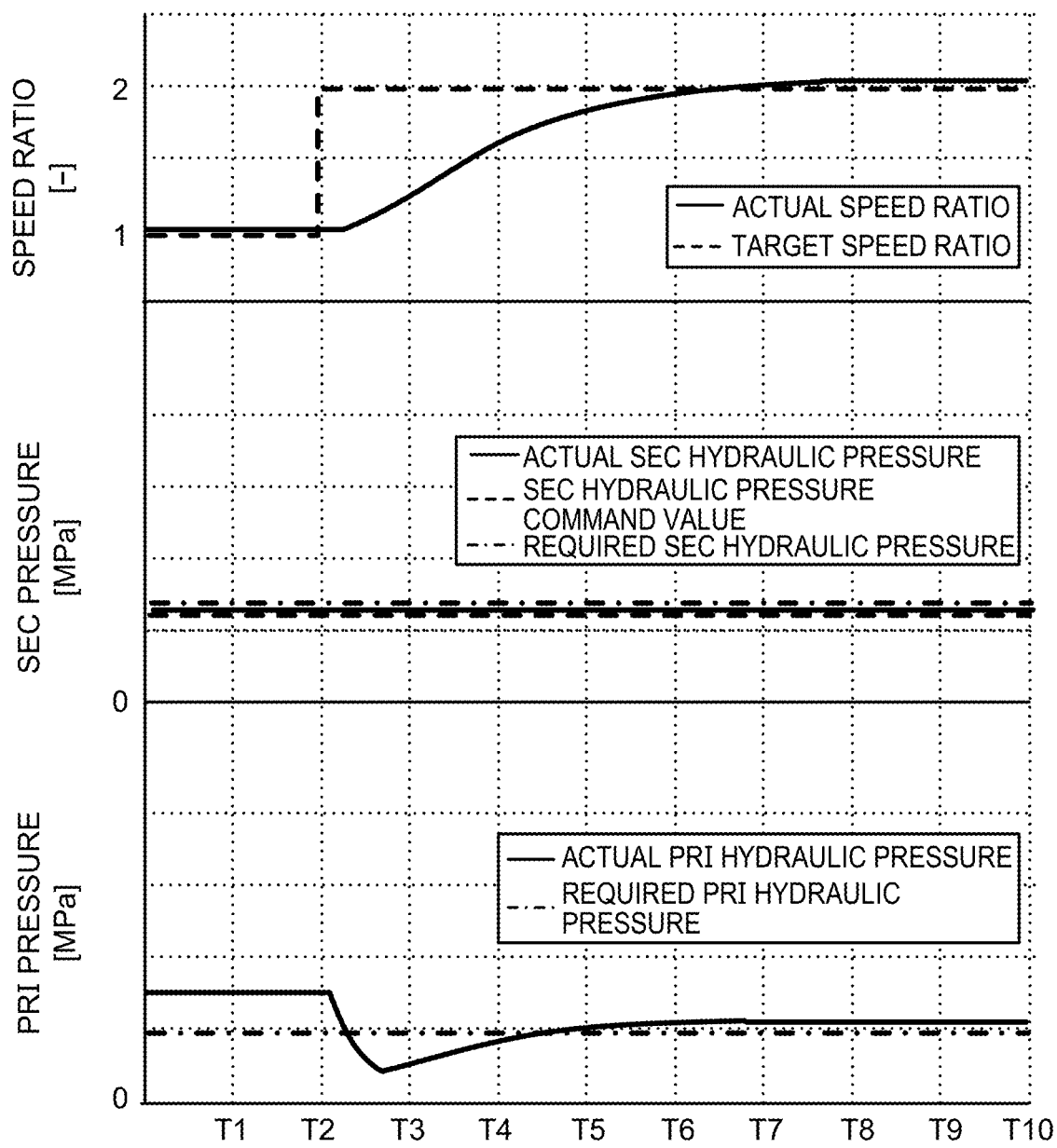
FIG. 7 is a timing chart of a comparative example relative to FIG. 6.

FIG. 6 is a timing chart to describe the advantageous effects from the correction of the secondary hydraulic-pressure steady command value Psec_com1 with the secondary hydraulic-pressure transient command value Psec_com2. FIG. 7 shows a comparative example of the present embodiment, and is a timing chart showing the case of executing well-known control without executing the control routine in FIG. 2 and FIG. 3 in the configuration of FIG. 1. The solid lines in these drawings indicate actual values, and the broken lines indicate command values (or target values). The dashed-dotted lines in these drawings indicate required secondary hydraulic pressure and required primary hydraulic pressure.

In both of FIG. 6 and FIG. 7, downshifting is executed to change the target speed ratio from 1 to 2 at timing T2.

When the secondary hydraulic pressure is kept still constant after downshifting, the actual primary hydraulic pressure decreases. The amount of decrease of the actual primary hydraulic pressure increases with the shift speed. As in the comparative example shown in FIG. 7, the actual primary hydraulic pressure may fall below the required primary hydraulic pressure.

On the contrary, the present embodiment shown in FIG. 6 corrects the secondary hydraulic-pressure steady command value Psec_com1 with the secondary hydraulic-pressure transient command value Psec_com2 that is a correction term in accordance with the changing rate of the speed ratio, and so increases the secondary hydraulic-pressure command value with a decrease in the actual primary hydraulic pressure. As a result, the present embodiment suppresses a decrease amount of the actual primary hydraulic pressure, and keeps it at the required primary hydraulic pressure. That is, the present embodiment suppresses belt slip at the primary pulley 4 not only in the stead state but also during shifting.

Figure 8:
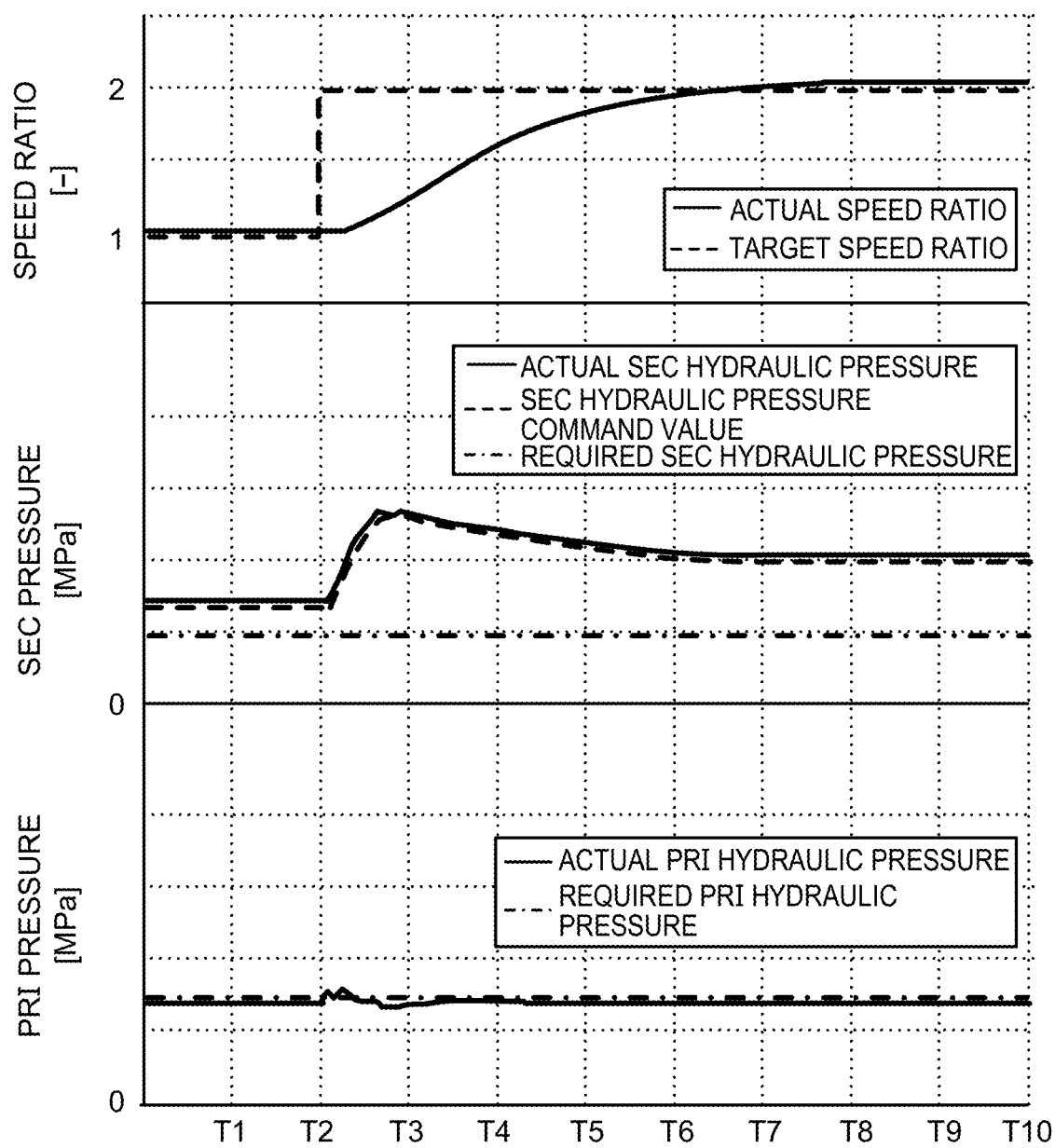
FIG. 8 is a timing chart of the control based on a secondary hydraulic-pressure FB compensation command value.
Figure 9:
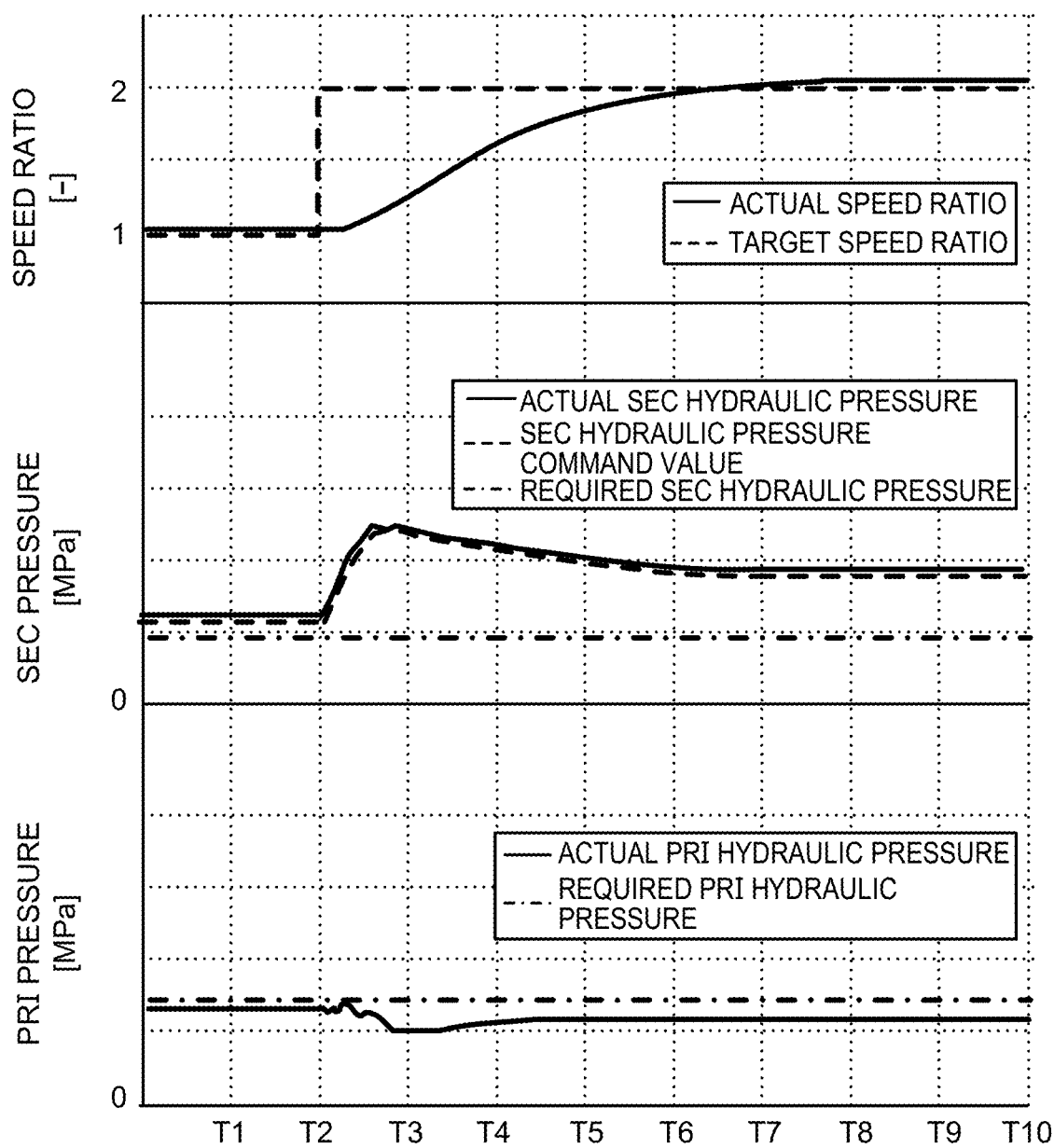
FIG. 9 is a timing chart of a comparative example relative to FIG. 8.

FIG. 8 is a timing chart to describe the advantageous effects from the correction of the secondary hydraulic-pressure steady command value Psec_com1 with the secondary hydraulic-pressure transient command value Psec_com2 and the secondary hydraulic-pressure FB compensation command value Psec_com3. Similarly to FIG. 6, FIG. 9 is a timing chart for the correction of the secondary hydraulic-pressure steady command value Psec_com1 just with the secondary hydraulic-pressure transient command value Psec_com2. The solid lines in these drawings indicate actual values, and the broken lines indicate command values (or target values). The dashed-dotted lines in these drawings indicate required secondary hydraulic pressure and required primary hydraulic pressure.

As stated above, the correction of the secondary hydraulic-pressure steady command value Psec_com1 with the secondary hydraulic-pressure transient command value Psec_com2 suppresses a decrease of the actual primary hydraulic pressure to fall below the required primary hydraulic pressure during shifting. If the property of the continuously variable transmission 9 changes with the aging variations of the components, for example, as shown in FIG. 9, this can suppress the decrease amount of the actual primary hydraulic pressure, but the actual primary hydraulic pressure and the required primary hydraulic pressure may differ from each other.

The correction with the secondary hydraulic-pressure FB compensation command value Psec_com3 eliminates a difference between the actual primary hydraulic pressure and the required primary hydraulic pressure as shown in FIG. 8.

As stated above, the present embodiment corrects the secondary hydraulic-pressure steady command value Psec_com1 with the secondary hydraulic-pressure transient command value Psec_com2 and the secondary hydraulic-pressure FB compensation command value Psec_com3, and sets the corrected value as the final secondary hydraulic-pressure command value Psec_com. In another embodiment, the secondary hydraulic-pressure steady command value Psec_com1 may be set as the secondary hydraulic-pressure command value Psec_com. This configuration also suppresses belt slip in the steady state as shown in FIG. 4. In this embodiment, the shift speed may be decreased so as to suppress belt slip during shifting.

The correction with the secondary hydraulic-pressure FB compensation command value Psec_com3 also may be omitted in some cases. Such correction with the secondary hydraulic-pressure FB compensation command value Psec_com3 aims to eliminate a displacement caused by a change in mechanical property of the continuously variable transmission 9 due to aging variations or the like. Instead of the correction with the secondary hydraulic-pressure FB compensation command value Psec_com3 for every calculation, duty command values, for example, may be adjusted to cancel the displacement over a several months period, for example.

As stated above, the present embodiment calculates the secondary hydraulic-pressure steady command value Psec_com1 based on the required primary hydraulic pressure Ppri_com that is the pressure in the primary oil chamber 4A necessary to transmit the input torque to the output side, and controls the electric pump 14 based on the calculated value. Such adjustment of the secondary hydraulic pressure means the control of the primary hydraulic pressure. As a result, the present embodiment suppresses deterioration of the fuel efficiency resulting from a failure in torque transmission due to a decrease in primary hydraulic pressure or an unnecessary increase of the primary hydraulic pressure due to disturbance.

The present embodiment calculates the secondary hydraulic-pressure steady command value Psec_com1 based on the required primary hydraulic pressure Ppri_com and the balance thrust-force ratio Bratio. This improves the control accuracy of the primary hydraulic pressure when the speed ratio is constant, i.e., in the steady state.

The present embodiment corrects the secondary hydraulic-pressure steady command value Psec_com1 based on the changing rate of the target speed ratio or the changing rate of the actual speed ratio. Specifically the present embodiment corrects the value having a larger changing rate of downshifting to increase the pressure and corrects the value having a larger changing rate of upshifting to decrease the pressure. This improves the control accuracy of the primary hydraulic pressure during shifting.

The present embodiment corrects the secondary hydraulic-pressure steady command value Psec_com1 based on the required primary hydraulic pressure Ppri_com and the actual primary hydraulic pressure Ppri. This suppresses influences from a change in the mechanical property of the continuously variable transmission 9 due to aging variations or the like.

Second Embodiment

The first embodiment as described above adjusts the secondary hydraulic pressure and accordingly controls the primary hydraulic pressure. This suppresses deterioration of the fuel efficiency resulting from a failure in torque transmission due to a decrease in primary hydraulic pressure or an unnecessary increase of the primary hydraulic pressure due to disturbance. Such control, however, does not control the secondary hydraulic pressure during the control of the primary hydraulic pressure. This leads to a problem that transmission of the torque fails due to a decrease in secondary hydraulic pressure during upshifting, for example. This problem can be avoided by limiting the shift speed, and such limitation of the shift speed, however, degrades the responsiveness of the shift.

The CVT control unit 15 of the present embodiment then executes the control routine as described below to suppress a decrease of the secondary hydraulic pressure as stated above without limiting the shift speed.

Figure 10:
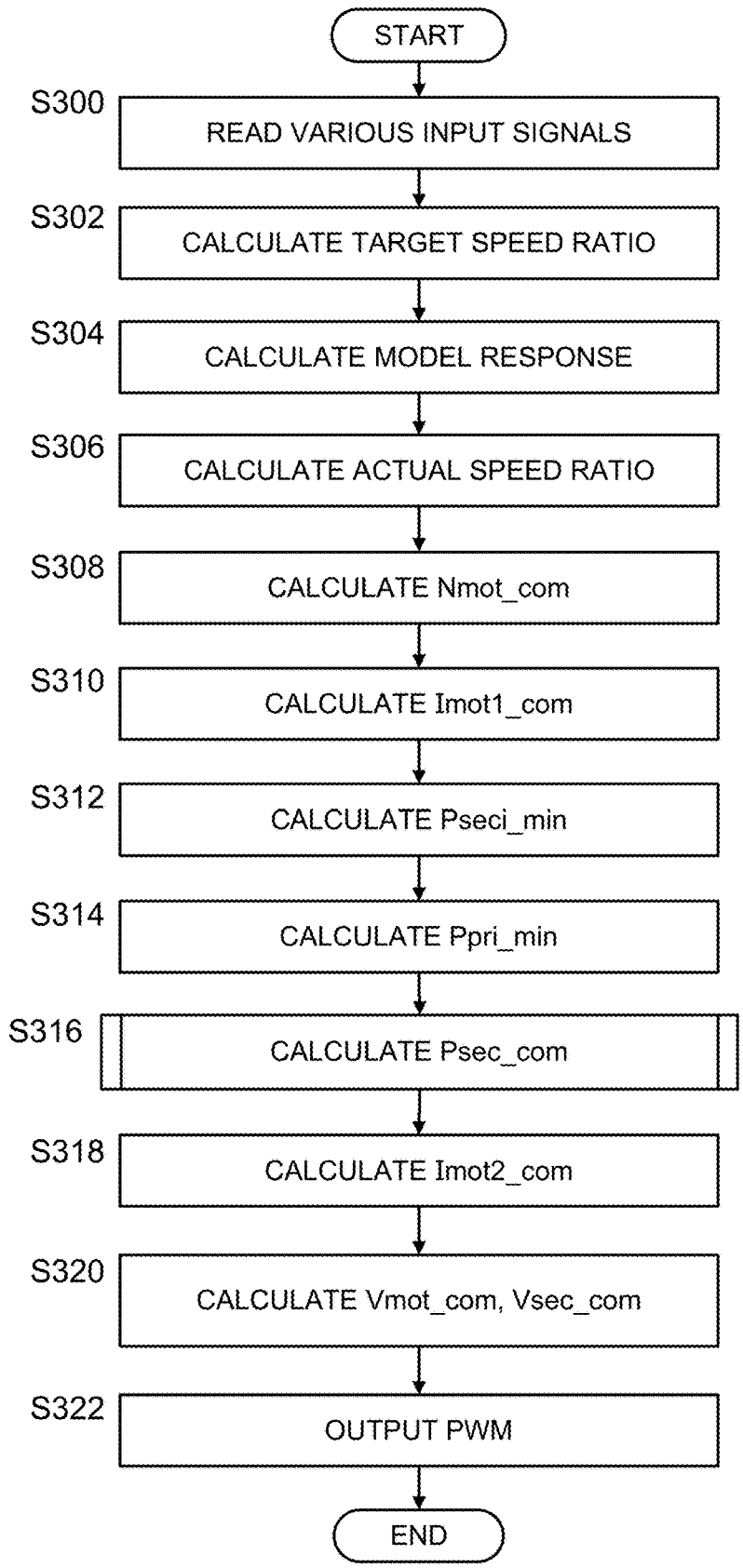
FIG. 10 is a flowchart showing the control routine programmed in a CVT control unit.

FIG. 10 is a flowchart showing the control routine programmed in the CVT control unit 15. This control routine partly includes interrupt processing, and basically runs with a constant sampling period. The following describes the processing step-by-step.

Steps S300 to S310 are similar to steps S100 to S110 in FIG. 2, and so their descriptions are omitted.

At step S312, the CVT control unit 15 calculates a secondary lower-limit hydraulic pressure Psec_min that is a lower-limit of the required secondary hydraulic pressure. Specifically the property of the secondary hydraulic pressure that is required to transmit the input torque may be measured beforehand, and this property may be stored in the ROM in the form of map data. Then the secondary lower-limit hydraulic pressure may be calculated with the map data based on the input torque. This map data on the secondary hydraulic pressure property is similar to a well-known data, and the illustration of this map data is omitted.

At step S314, the CVT control unit 15 calculates a primary lower-limit hydraulic pressure Ppri_min that is a lower-limit of the required primary hydraulic pressure. Specifically the property of the primary hydraulic pressure that is required to transmit the input torque may be measured beforehand, and this property may be stored in the ROM in the form of map data. Then the primary hydraulic pressure command value may be calculated with the map data based on the input torque. This map data on the primary hydraulic pressure property is similar to a well-known data, and the illustration of this map data is omitted.

At step S316, the CVT control unit 15 calculates a secondary hydraulic-pressure command value Psec_com based on the primary lower-limit hydraulic pressure Ppri_min. The details of the calculation are described later.

Steps S318 to S322 are similar to steps S116 to S120 in FIG. 2, and so their descriptions are omitted.

Next the following describes the processing at step S316.

Figure 11:
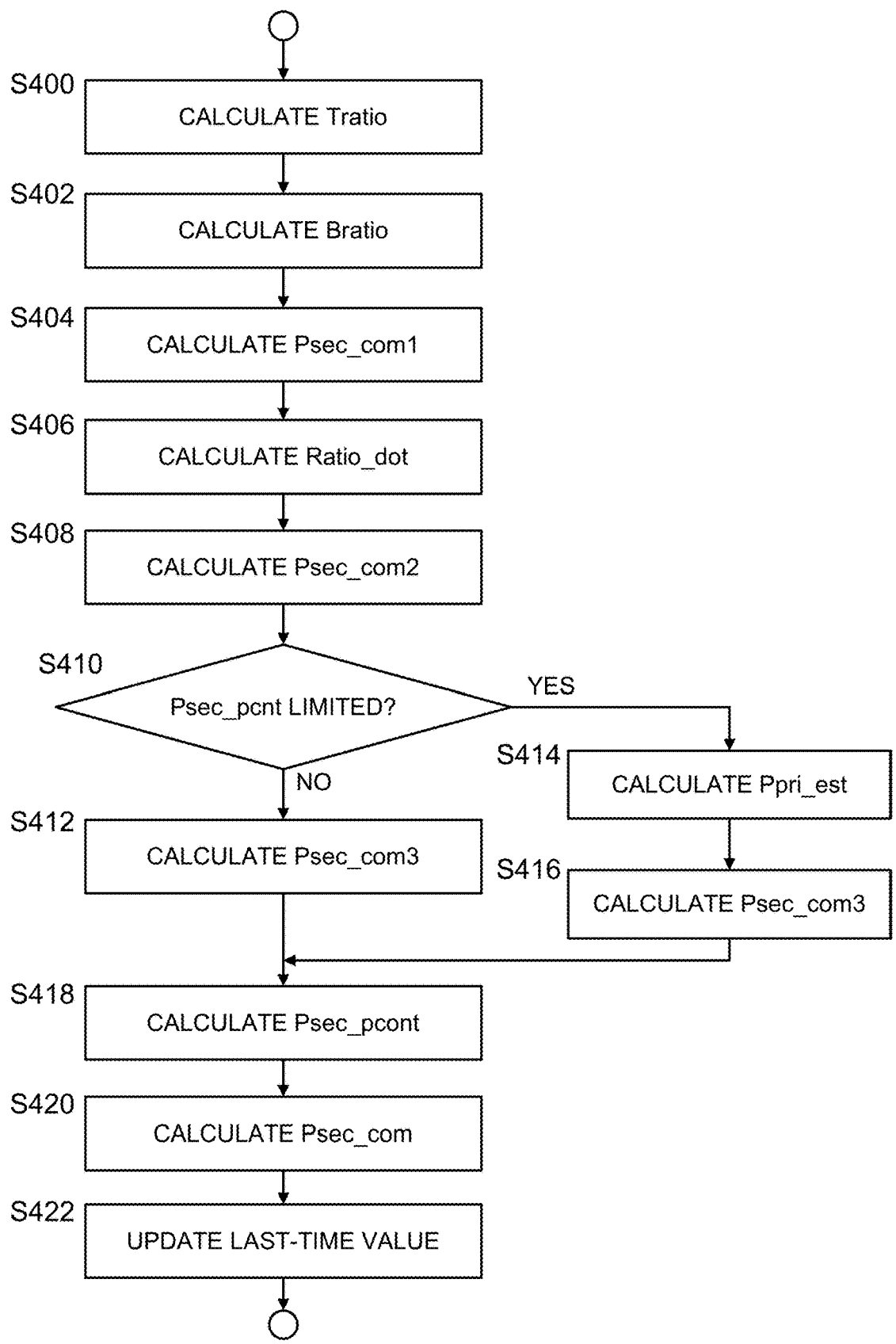
FIG. 11 is a flowchart showing the subroutine executed at step S316 in FIG. 10.

FIG. 11 is a flowchart showing the subroutine executed at step S316.

Steps S400 to S408 are similar to steps S200 to S208 in FIG. 3, and so their descriptions are omitted.

At step S410, the CVT control unit 15 determines whether the secondary hydraulic-pressure command value for primary hydraulic-pressure control Psec_pcont is limited or not with the secondary lower-limit hydraulic pressure Psec_min in the last calculation. In one example, the CVT control unit 15 determines that the command value is limited in that way when Expression (12) holds based on the last-time value Psec_pcont_k−1 of the secondary hydraulic-pressure command value for primary hydraulic-pressure control and the last-time value Psec_com_k−1 of the secondary hydraulic-pressure command value.

[Math. 12]

$$P_{sec\_com\_k-1} > P_{sec\_pcont\_k-1} \tag{2}$$

When Expression (12) holds, then the CVT control unit 15 executes the processing at step S414. When Expression (12) does not hold, the CVT control unit 15 executes the processing at step S412.

At step S412, the CVT control unit 15 calculates a secondary hydraulic-pressure FB compensation command value Psec_com3 based on the primary lower-limit pressure Ppri_min and the primary pressure Ppri. In one example, the CVT control unit 15 calculates this value by applying I control to a difference between the primary lower-limit hydraulic pressure and the primary hydraulic pressure as shown in Expression (13). In Expression (13), Kpri denotes an integration gain, which can be determined while considering the stability of the feedback loop.

[Math. 13]

$$P_{sec\_com3} = \frac{K_{pri}}{s} \times (P_{pri\_min} - P_{pri}) \tag{13}$$

At step S414, the CVT control unit 15 calculates a primary hydraulic-pressure estimation value Ppri_est. This primary hydraulic-pressure estimation value Ppri_est is obtained by correcting an actual primary hydraulic pressure Ppri used for the calculation of the secondary hydraulic-pressure FB compensation command value Psec_com3. In one example, the CVT control unit 15 calculates this value by Expression (14) based on the last-time value Psec_pcont_k−1 of the secondary hydraulic-pressure command value for primary hydraulic-pressure control and the last-time value Psec_com_k−1 of the secondary hydraulic-pressure command value, and the balance thrust-force ratio Bratio.

[Math. 14]

$$P_{pri\_est} = P_{pri} - B_{ratio} \times (P_{sec\_com\_k-1} - P_{sec\_pcont\_k-1}) \quad (14)$$

At step S416, the CVT control unit 15 calculates a secondary hydraulic-pressure FB compensation command value Psec_com3 based on the primary lower-limit hydraulic pressure Ppri_min and the primary hydraulic-pressure estimation value Ppri_est. In one example, the CVT control unit 15 calculates this value by applying I control similar to S412 to a difference between the primary lower-limit hydraulic pressure Ppri_min and the primary pressure estimation value Ppri_est by Expression (15).

[Math. 15]

$$P_{sec\_com3} = \frac{K_{pri}}{s} \times (P_{pri\_com} - P_{pri\_est}) \quad (15)$$

When the primary hydraulic-pressure command value Ppri_com is equal to or less than the primary hydraulic-pressure estimation value Ppri_est, the correction for decrease is prohibited to avoid belt slip. This means that as shown in Expression (16), the last-time value Psec_com3_k−1 of the secondary hydraulic-pressure FB compensation command value Psec_com3 is set for the calculation result this time.

[Math. 16]

$$P_{sec\_sem3} = P_{sec\_com3\_k-1} \quad (16)$$

At step S418, the CVT control unit 15 calculates a secondary hydraulic-pressure command value for primary hydraulic-pressure control Psec_pcont by Expression (17) based on the secondary hydraulic-pressure steady command value Psec_com1, the secondary hydraulic-pressure transient command value Psec_com2 and the secondary hydraulic-pressure FB compensation command value Psec_com3.

[Math. 17]

$$P_{sec\_pcont} = P_{sec\_com1} + P_{sec\_com2} + P_{sec\_com3} \quad (17)$$

At step S420, the CVT control unit 15 sets a large value between the secondary hydraulic-pressure command value for primary hydraulic-pressure control Psec_pcont and the secondary lower-limit hydraulic pressure Psec_min like Expression (18) as a secondary hydraulic-pressure command value Psec_com as a final command value.

[Math. 18]

$$P_{sec\_com} = \max(P_{sec\_pcont}, P_{sec\_min}) \quad (18)$$

At step S422, the CVT control unit 15 updates the last-time value in accordance with Expressions (19), (20), and (21).

[Math. 19]

$$P_{sec\_com3\_k-1} = P_{sec\_com3} \quad (19)$$

[Math. 20]

$$P_{sec\_pcont\_k-1} = P_{sec\_pcont} \quad (20)$$

[Math. 21]

$$P_{sec\_com\_k-1} = P_{sec\_com} \quad (21)$$

The following describes the advantageous effects from the present embodiment.

Figure 12:
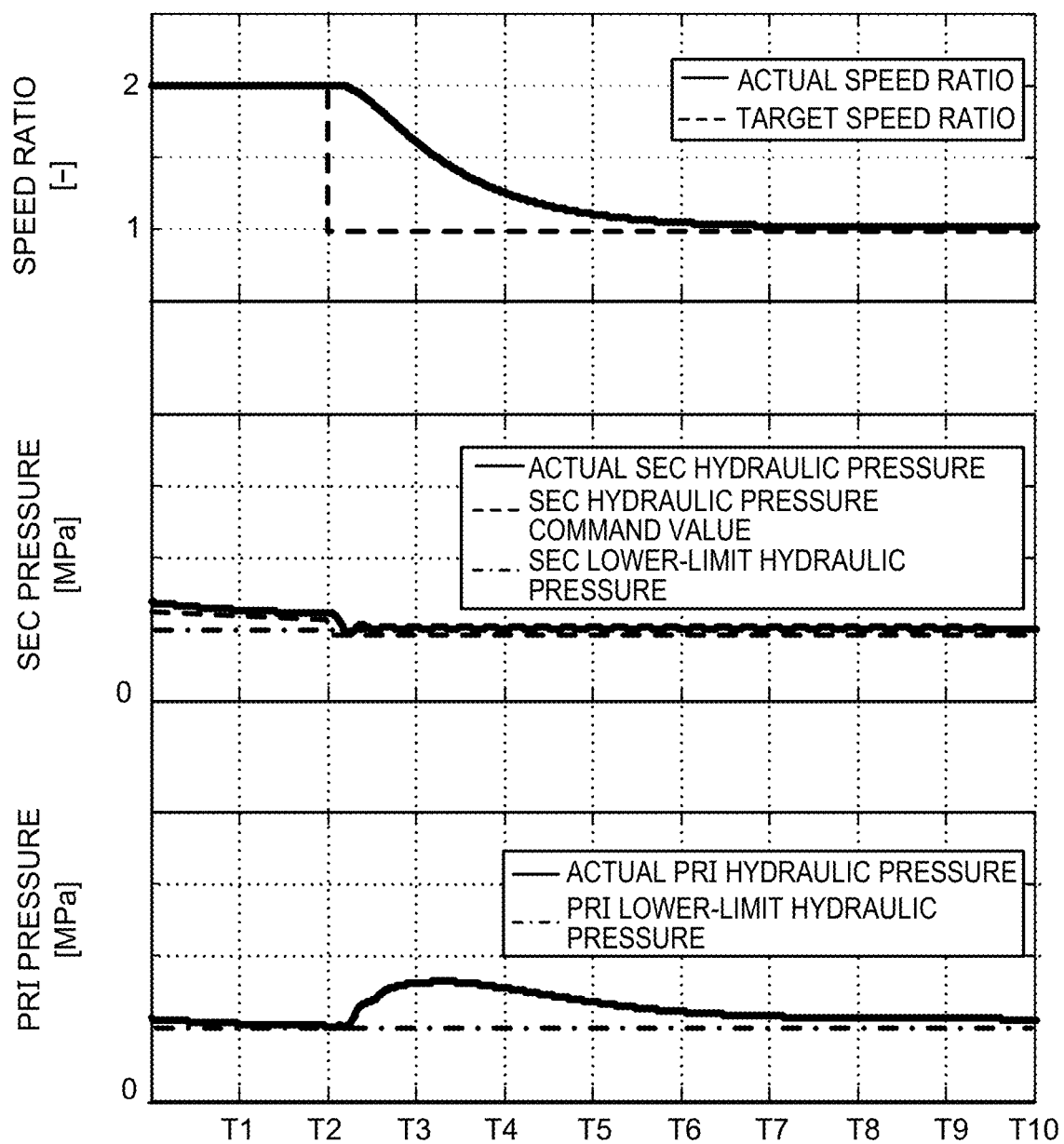
FIG. 12 is a timing chart to describe the advantageous effects from the processing at step S420 in FIG. 11.
Figure 13:
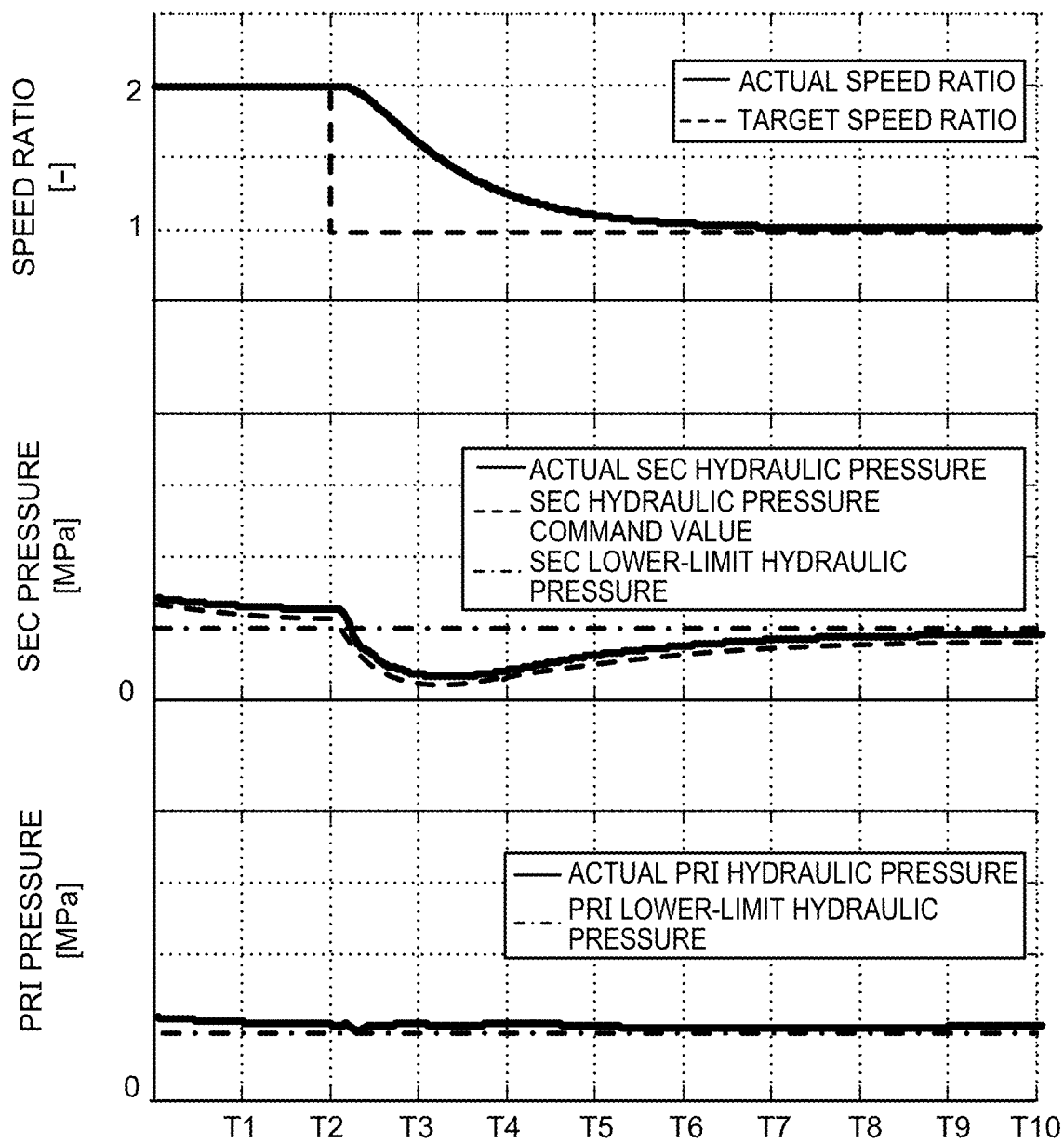
FIG. 13 is a timing chart of a comparative example relative to FIG. 12.

FIG. 12 is a timing chart to describe the advantageous effects from the processing at step S420 in FIG. 11. FIG. 13 is a timing chart when the processing at step S420 is not executed, that is, when the secondary hydraulic-pressure command value for primary hydraulic-pressure control Psec_pcont is directly set as the secondary hydraulic-pressure command value Psec_com as a final command value. The timing chart of FIG. 13 shows a comparative example, which is not included in the scope of the present embodiment.

Both of FIG. 12 and FIG. 13 show the case of changing the speed ratio from 2 to 1 by upshifting while controlling the primary hydraulic pressure at 1 MPa.

Oil is supplied from the secondary oil chamber 4B to the primary oil chamber 4A during upshifting. The control by setting the secondary hydraulic-pressure command value for primary hydraulic-pressure control Psec_pcont as the final command value to keep the primary hydraulic pressure constant changes the secondary hydraulic pressure while letting it take natural course. As shown FIG. 13, such control while setting the secondary hydraulic-pressure command value for primary hydraulic-pressure control Psec_pcont as the final command value to keep the primary hydraulic pressure at 1 MPa decreases the actual secondary hydraulic pressure in response to the start of the shift at timing T3 to fall below the secondary lower-limit hydraulic pressure.

On the contrary, the processing at step S420 keeps the secondary hydraulic pressure at the secondary lower-limit hydraulic pressure Psec_min as shown in FIG. 12.

As shown in FIG. 12, the secondary lower-limit hydraulic pressure Psec_min is set at the secondary hydraulic-pressure command value Psec_com, and this keeps the secondary hydraulic pressure at the secondary lower-limit hydraulic pressure Psec_min while the actual primary hydraulic pressure increases during shifting. That is, the primary hydraulic pressure substantially equals to the primary lower-limit hydraulic pressure Ppri_min before timing T2, and the secondary hydraulic pressure substantially equals to the secondary lower-limit hydraulic pressure Psec_min after timing T2. This suppresses deterioration of the fuel efficiency resulting from an unnecessary increase of the hydraulic pressure.

Figure 14:
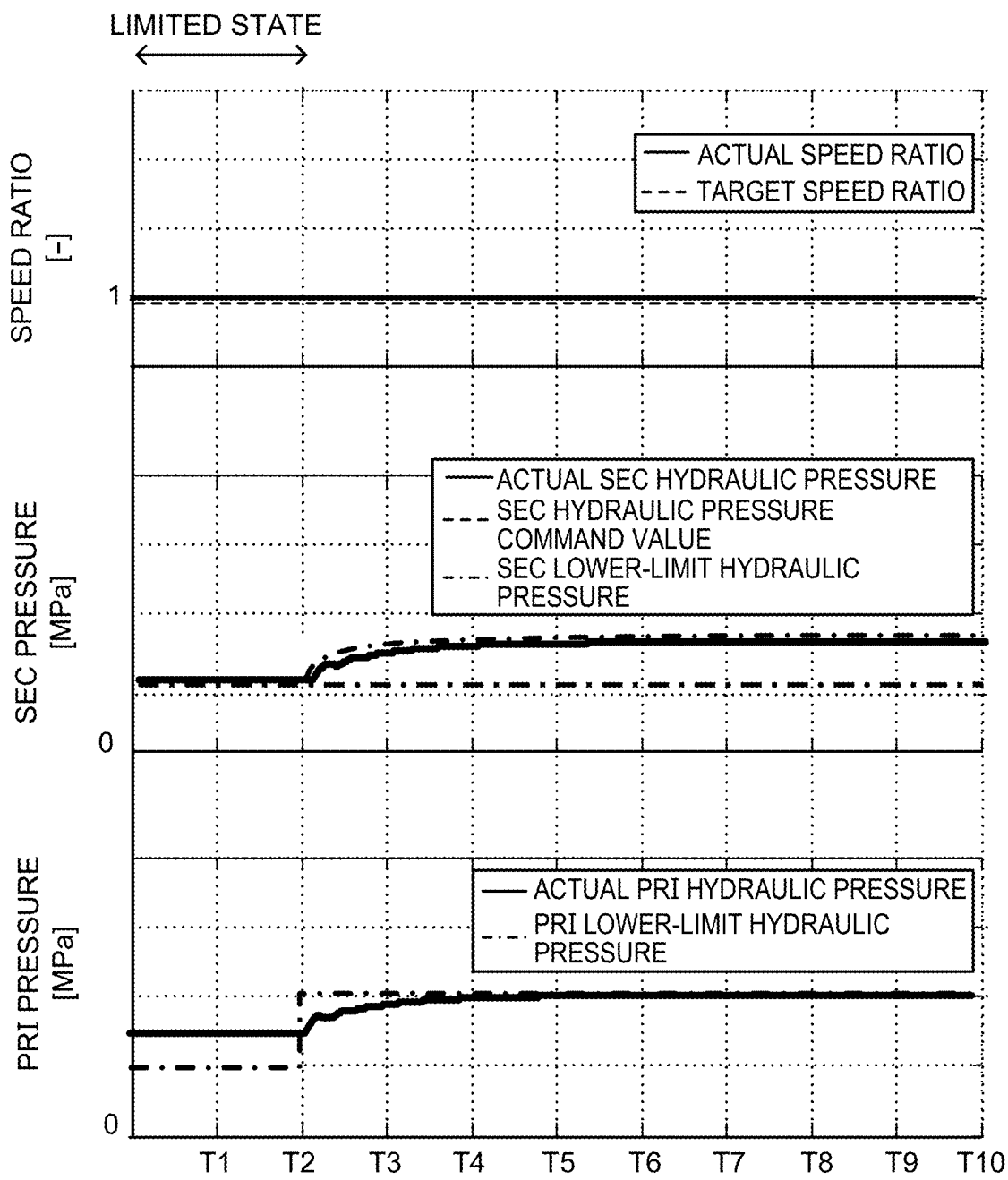
FIG. 14 is a timing chart to describe the advantageous effects from the processing at step S414 in FIG. 11.
Figure 15:
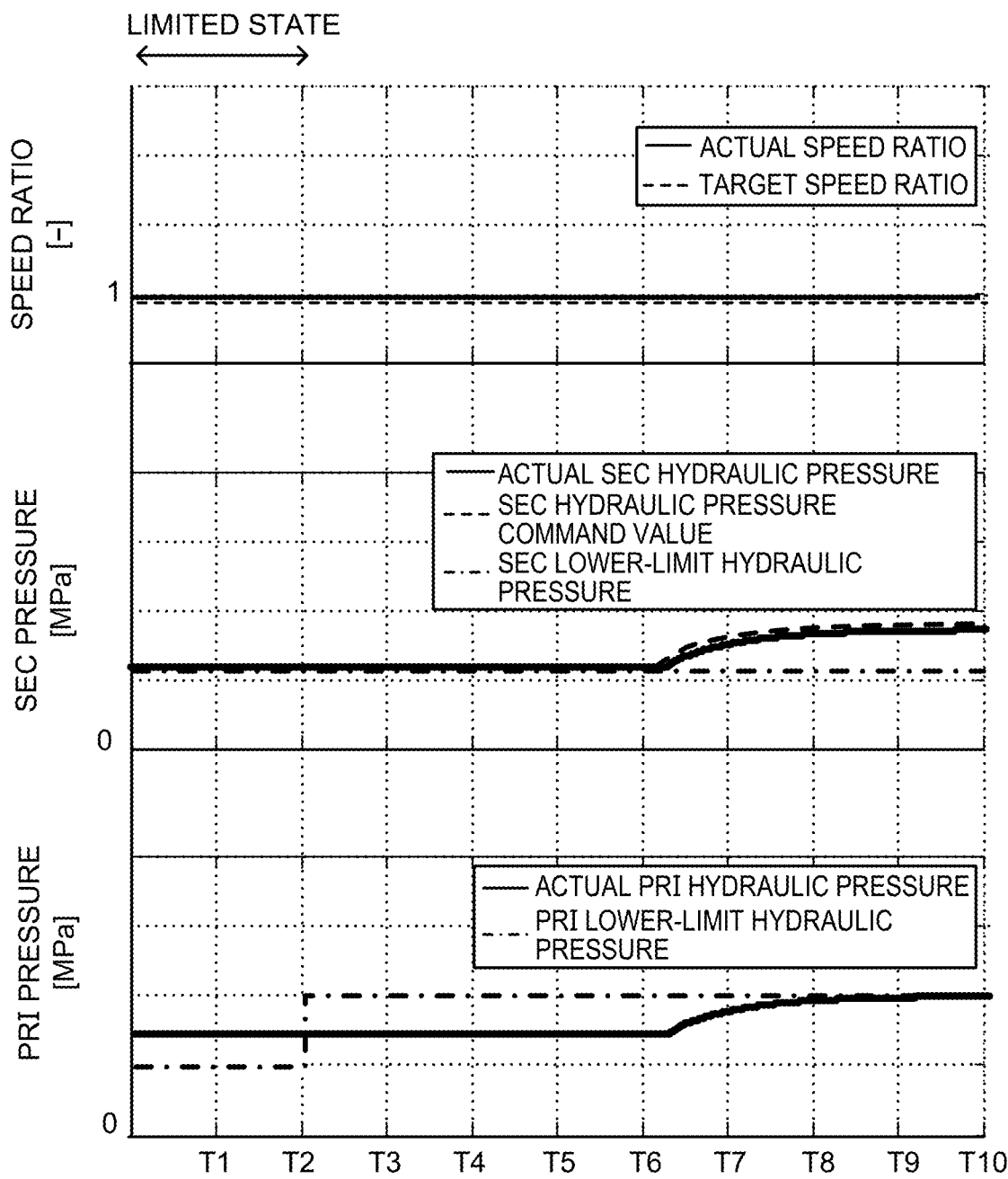
FIG. 15 is a timing chart of a comparative example relative to FIG. 14.

FIG. 14 is a timing chart to describe the advantageous effects from the processing at step S414 in FIG. 11. FIG. 15 is a timing chart when the processing at step S414 is not executed, that is, when the secondary hydraulic-pressure command value Psec_com is limited to the secondary lower-limit hydraulic pressure Psec_min, the actual primary hydraulic pressure Ppri used for the calculation of the secondary hydraulic-pressure FB compensation command value Psec_com3 is not corrected.

Both of FIG. 14 and FIG. 15 show the case of changing the primary hydraulic-pressure command value from 1 MPa to 2 MPa while keeping the speed ratio at 1. In both of FIG. 14 and FIG. 15, the secondary hydraulic-pressure command value Psec_com is limited to the secondary lower-limit hydraulic pressure Psec_min before timing T2, and the limitation is canceled at timing T2.

This secondary hydraulic-pressure FB compensation command value Psec_com3 is a correction term used for feedback control of the secondary hydraulic-pressure command value for primary hydraulic-pressure control Psec_pcont to suppress influences from the variations of manufacturing, aging variations or the like. This means that the actual primary hydraulic pressure Ppri used by Expression (13) to calculate the secondary hydraulic-pressure FB compensation command value Psec_com3 has to be the actual primary hydraulic pressure Ppri when the secondary hydraulic-pressure command value Psec_com is equal to the secondary hydraulic-pressure command value for primary hydraulic-pressure control Psec_pcont.

However, when the secondary hydraulic-pressure command value Psec_com is limited to the secondary lower-limit hydraulic pressure Psec_min, the actual primary hydraulic pressure Ppri will have a value different from the value when the secondary hydraulic-pressure command value for primary hydraulic-pressure control Psec_pcont is set as the secondary hydraulic-pressure command value Psec_com. This means that calculation of the secondary hydraulic-pressure FB compensation command value Psec_com3 without correcting the actual primary hydraulic pressure Ppri during the duration of limiting the secondary hydraulic-pressure command value Psec_com to the secondary lower-limit hydraulic pressure Psec_min will generate an error in the feedback control corresponding to a difference of the actual primary hydraulic pressure Ppri. A longer duration for the limitation accumulates the error more.

As shown in FIG. 15, such accumulation of the error causes a delay after the limitation is canceled at timing T2 and before the secondary hydraulic-pressure command value for primary hydraulic-pressure control Psec_pcont increases, and this results in a delay in an increase of the primary hydraulic pressure Ppri to the primary lower-limit hydraulic pressure.

On the contrary, as shown in FIG. 14, execution of the processing at step S414 suppresses such accumulation of the error, and this leads to a speedy increase of the secondary hydraulic pressure Psec after the cancelation of the limitation at timing T2. This suppresses such a delay in an increase of the primary hydraulic pressure Ppri.

Figure 16:
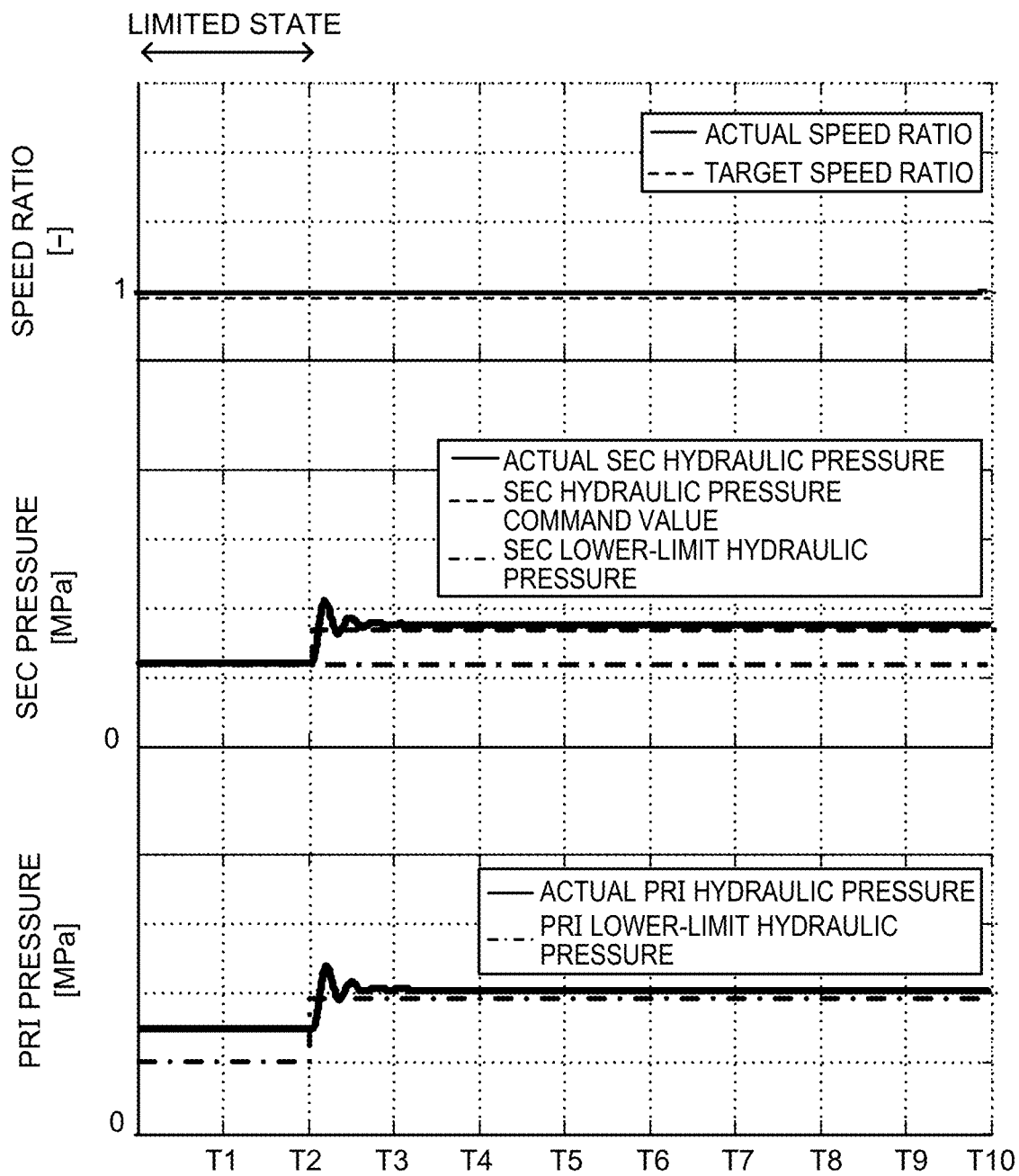
FIG. 16 is a timing chart to describe the advantageous effects from the processing at step S416 in FIG. 11.
Figure 17:
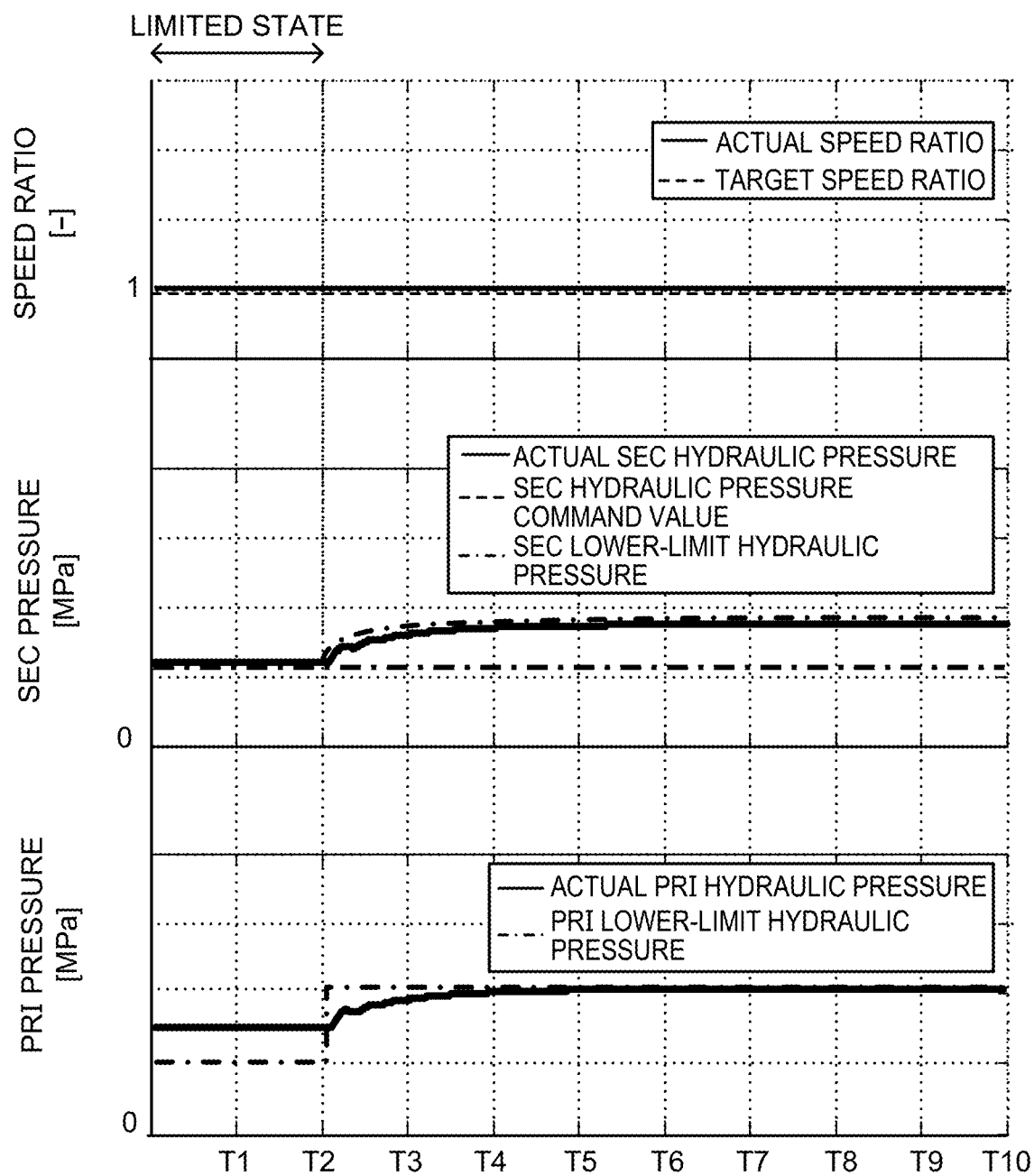
FIG. 17 is a timing chart of a comparative example relative to FIG. 16.

FIG. 16 is a timing chart to describe the advantageous effects from the processing at step S416 in FIG. 11. FIG. 17 is a timing chart when the processing at step S416 is not executed, that is, when the secondary hydraulic-pressure command value Psec_com is limited to the secondary lower-limit hydraulic pressure Psec_min, the control routine does not prohibit the secondary hydraulic-pressure FB compensation command value Psec_com3 from having a negative value.

Both of FIG. 16 and FIG. 17 show the case of changing the primary hydraulic-pressure command value from 1 MPa to 2 MPa while keeping the speed ratio at 1. In both of FIG. 16 and FIG. 17, the secondary hydraulic-pressure command value Psec_com is limited to the secondary lower-limit hydraulic pressure Psec_min before timing T2, and the limitation is canceled at timing T2.

The processing at step S414 may cause the case of an insufficient amount of correction for the actual primary hydraulic pressure Ppri due to some reasons, including an error in each term of Expression (14). In such a case, the control routine has to prohibit the secondary hydraulic-pressure FB compensation command value Psec_com3 from having a negative value. Otherwise, an error toward pressure reduction may accumulate in the feedback control of the secondary hydraulic-pressure command value for primary hydraulic-pressure control Psec_pcont by Expression (17), i.e., in the feedback control of the primary hydraulic pressure. Such accumulation of an error toward pressure reduction delays an increase of the primary hydraulic pressure Ppri after cancelation of the limit at timing T2.

A comparison between FIG. 16 and FIG. 17 shows that FIG. 16 that prohibits the correction toward pressure reduction allows the primary hydraulic pressure Ppri to increase to the primary lower-limit hydraulic pressure in a shorter time after timing T2.

A delay in an increase of the primary hydraulic pressure Ppri, if any, may cause belt slip due to the shortage of the primary hydraulic pressure Ppri. On the contrary, a speedy increase as in FIG. 16 prevents belt slip.

As stated above, the present embodiment calculates the secondary hydraulic-pressure command value for primary hydraulic-pressure control based on the lower-limit pressure of the required primary hydraulic pressure, and calculates the secondary lower-limit hydraulic pressure that is the lower-limit pressure of the required secondary hydraulic pressure. Then if the secondary hydraulic-pressure command value for primary hydraulic-pressure control is lower than the secondary lower-limit hydraulic pressure, the present embodiment controls the electric pump 14 based on the secondary lower-limit hydraulic pressure. This keeps the lower-limit pressure for both of the primary hydraulic pressure and the secondary hydraulic pressure. This keeps at least one of the primary hydraulic pressure and the secondary hydraulic pressure at the lower-limit pressure, and so suppresses deterioration of the fuel efficiency resulting from an unnecessary increase of the pressure. There is no need to limit the shift speed to keep the lower-limit pressure for the primary hydraulic pressure and the secondary hydraulic pressure, and so the present embodiment enables speedy upshifting and downshifting.

When the secondary hydraulic-pressure command value is limited to the secondary lower-limit hydraulic pressure, the present embodiment corrects the actual primary hydraulic pressure based on a difference between the secondary lower-limit hydraulic pressure and the secondary hydraulic-pressure command value. This suppresses accumulation of an error in the feedback control of the primary hydraulic pressure. This allows the primary hydraulic pressure to speedily follow the lower-limit pressure after cancelation of the limit.

When the secondary hydraulic-pressure command value is limited to the secondary lower-limit hydraulic pressure, the present embodiment prohibits the correction of the secondary hydraulic-pressure command value toward pressure reduction. This suppresses accumulation of an error toward pressure reduction in the feedback control of the primary hydraulic pressure. This prevents belt slip without degrading the following of the primary hydraulic pressure to the lower-limit pressure after cancelation of the limit.

The above embodiments of the present invention are merely a part of examples of the application of the present invention, and the technical scope of the present invention is not limited to the specific constitutions of the above embodiments.

The invention claimed is:
1. A method for controlling a continuously variable transmission, the transmission including:
   a primary pulley and a secondary pulley;
   a belt wound around the primary pulley and the secondary pulley;

a primary oil chamber for changing a belt clamping force of the primary pulley and a secondary oil chamber for changing a belt clamping force of the secondary pulley;

an oil pump disposed in an oil passage between the primary oil chamber and the secondary oil chamber to control a flow of oil from the secondary oil chamber to the primary oil chamber; and an oil supply source to supply oil to the secondary oil chamber, the method comprising:

detecting a rotation speed of the primary pulley, a rotation speed of the secondary pulley, and a vehicle speed; and controlling the oil pump in accordance with a result of the detecting;

wherein the method further comprises:

calculating a secondary hydraulic-pressure command value based on a required primary hydraulic pressure that is a pressure in the primary oil chamber required to transmit an input torque to an output side;

setting a target speed ratio of the continuously variable transmission in accordance with an operating state;

correcting the secondary hydraulic-pressure command value based on a changing rate of the target speed ratio or a changing rate of an actual speed ratio; and controlling the oil supply source in accordance with the corrected secondary hydraulic-pressure command value.

2. The method for controlling the continuously variable transmission according to claim 1, wherein the method calculates a secondary hydraulic-pressure command value for primary hydraulic-pressure control based on a lower-limit pressure of the required primary hydraulic pressure, instead of calculating the secondary hydraulic-pressure command value, the method calculates a secondary lower-limit hydraulic pressure that is a lower-limit pressure in the secondary oil chamber necessary to transmit an input torque to the output side, and when the secondary hydraulic-pressure command value for primary hydraulic-pressure control is lower than the secondary lower-limit hydraulic pressure, the method controls the oil supply source based on the secondary lower-limit hydraulic pressure.

3. The method for controlling the continuously variable transmission according to claim 1, wherein the method calculates the secondary hydraulic-pressure command value based on the required primary hydraulic pressure and a balance thrust-force ratio.

4. The method for controlling the continuously variable transmission according to claim 1, wherein the method corrects the secondary hydraulic-pressure command value to increase pressure for a larger changing rate of downshifting, and the method corrects the secondary hydraulic-pressure command value to decrease pressure for a larger changing rate of upshifting.

5. The method for controlling the continuously variable transmission according to claim 1, wherein the method corrects the secondary hydraulic-pressure command value based on the required primary hydraulic pressure and an actual primary hydraulic pressure.

6. The method for controlling the continuously variable transmission according to claim 5, wherein when the oil supply source is controlled based on the secondary lower-limit hydraulic pressure instead of the secondary hydraulic-pressure command value, the method corrects the actual primary hydraulic pressure based on a difference between the secondary lower-limit hydraulic pressure and the secondary hydraulic-pressure command value.

7. The method for controlling the continuously variable transmission according to claim 5, wherein when the oil supply source is controlled based on the secondary lower-limit hydraulic pressure instead of the secondary hydraulic-pressure command value, the method prohibits correction of the secondary hydraulic-pressure command value to decrease pressure.

8. A control device for a continuously variable transmission including a primary pulley and a secondary pulley, the continuously variable transmission being configured to control shift by changing a belt clamping force for the pulleys, the control device comprising:

an oil passage connecting a primary oil chamber for the primary pulley and a secondary oil chamber for the secondary pulley;

an oil pump disposed in the oil passage to control a flow of oil between the primary oil chamber and the secondary oil chamber;

an oil supply source configured to supply oil to the secondary oil chamber;

a detector configured to detect a rotation speed of the primary pulley, a rotation speed of the secondary pulley, and a vehicle speed; and a controller configured to control the oil pump in accordance with a detection signal from the detector, the controller being configured to calculate a secondary hydraulic-pressure command value based on a required primary hydraulic pressure that is a pressure in the primary oil chamber required to transmit an input torque to an output side, set a target speed ratio of the continuously variable transmission in accordance with an operating state;

correct the secondary hydraulic-pressure command value based on a changing rate of the target speed ratio or a changing rate of an actual speed ratio; and control a hydraulic pressure in the secondary oil chamber in accordance with the corrected secondary hydraulic-pressure command value.

* * * * *